(12) United States Patent
Tagawa

(10) Patent No.: US 8,335,893 B2
(45) Date of Patent: Dec. 18, 2012

(54) STORAGE DEVICE, SYSTEM, AND METHOD THAT DETERMINES A PHYSICAL ADDRESS OF A MEMORY UNIT ALLOCATED TO A LOGICAL ADDRESS OR ALLOCATES A LOGICAL ADDRESS TO A PHYSICAL ADDRESS OF A MEMORY UNIT, BASED ON ACCESS SPEED INFORMATION OF THE LOGICAL ADDRESS

(75) Inventor: Yojiro Tagawa, Narashino (JP)

(73) Assignee: Canon Kabushiki Kaisha (JP)

( * ) Notice: Subject to any disclaimer, the term of this patent is extended or adjusted under 35 U.S.C. 154(b) by 777 days.

(21) Appl. No.: 12/047,560

(22) Filed: Mar. 13, 2008

(65) Prior Publication Data

US 2008/0235467 A1 Sep. 25, 2008

(30) Foreign Application Priority Data

Mar. 23, 2007 (JP) ................. 2007-077553

(51) Int. Cl.
*G06F 12/00* (2006.01)
(52) U.S. Cl. ............... 711/154; 711/1; 711/4; 711/101; 711/103; 711/111
(58) Field of Classification Search .............. None
See application file for complete search history.

(56) References Cited

U.S. PATENT DOCUMENTS

| 7,523,274 B2 | 4/2009 | Ryu et al. | |
| 2006/0184723 A1* | 8/2006 | Sinclair et al. | 711/103 |
| 2006/0248259 A1 | 11/2006 | Ryu et al. | |
| 2007/0276996 A1* | 11/2007 | Caulkins et al. | 711/113 |
| 2008/0104309 A1* | 5/2008 | Cheon et al. | 711/103 |

FOREIGN PATENT DOCUMENTS

| JP | 09-044394 A | 2/1997 |
| JP | 11-031102 A | 2/1999 |
| JP | 2000173281 A | 6/2000 |
| JP | 2001-306393 A | 11/2001 |
| KR | 10-2006-0109042 B1 | 10/2006 |
| WO | 2005043394 A1 | 5/2005 |

OTHER PUBLICATIONS

Japanese Office Action issued in corresponding Japanese Patent Application 2007-077553 dated May 12, 2012.
Office Action Issued in corresponding Japanese Patent Application No. 2007-077553 dated Aug. 21, 2012.

* cited by examiner

*Primary Examiner* — Matthew Bradley
*Assistant Examiner* — Alan Otto
(74) *Attorney, Agent, or Firm* — Rossi, Kimms & McDowell LLP

(57) ABSTRACT

A memory management device which is capable of allocating a memory unit accessible at a higher speed to data which is stored in a storage device having memory units different in access speed, without being limited in an storage area. The storage device comprises a BLC flash memory accessible at a predetermined access speed, an MLC flash memory accessible at a lower access speed than the predetermined access speed, a controller, and a RAM. The controller manages the BLC flash memory and the BLC flash memory in units each formed by a plurality of physical pages, and writes data in the physical pages, and the RAM holds page allocation information in which logical pages designated when writing data and the physical pages are associated with each other.

18 Claims, 22 Drawing Sheets

FIG. 5

| COMMAND | COMMAND NUMBER | FIRST PARAMETER | SECOND PARAMETER | THIRD PARAMETER |
|---|---|---|---|---|
| INITIALIZE | 0x00 | — | — | — |
| PAGE READ | 0x10 | START LOGICAL PAGE NUMBER | PAGE COUNT | — |
| PAGE WRITE | 0x20 | START LOGICAL PAGE NUMBER | PAGE COUNT | — |
| PAGE RATE | 0x40 | START LOGICAL PAGE NUMBER | PAGE COUNT | ACCESS SPEED |

FIG. 13

| SPEED DESIGNATION | ACCESS COUNT ≦ PREDETERMINED VALUE | ACCESS COUNT > PREDETERMINED VALUE | |
|---|---|---|---|
| | | AVERAGE ACCESS INTERVAL ≧ PREDETERMINED VALUE | AVERAGE ACCESS INTERVAL < PREDETERMINED VALUE |
| LOW SPEED | ○ | ○ | × |
| HIGH SPEED | × | ○ | ○ |

STORAGE DEVICE, SYSTEM, AND METHOD THAT DETERMINES A PHYSICAL ADDRESS OF A MEMORY UNIT ALLOCATED TO A LOGICAL ADDRESS OR ALLOCATES A LOGICAL ADDRESS TO A PHYSICAL ADDRESS OF A MEMORY UNIT, BASED ON ACCESS SPEED INFORMATION OF THE LOGICAL ADDRESS

BACKGROUND OF THE INVENTION

1. Field of the Invention

The present invention relates to a memory management device and method, in which a storage device having memory units different in access speed is used as a block device, and arbitrary data can be assigned to memory units having high-speed access speed, a program for implementing the memory management method, and a memory management system.

2. Description of the Related Art

Conventionally, flash memories have been widely used as storage media for digital cameras and the like. The flash memories include a binary type configured such that each memory cell takes two values and a multi-value type configured such that each memory cell takes more than two values. The multi-value flash memory having a larger storage capacity per unit cell than the binary flash memory is advantageous in that it is possible to increase capacity at low costs. However, the multi-value flash memory requiring complicated control for multi-value processing is disadvantageous in that access speed is lower.

Recently, there has been proposed a hybrid flash memory as a combination of the multi-value flash memory and the binary flash memory. The hybrid flash memory makes it possible to increase both capacity and access speed at low costs.

Further, there has been proposed a storage device which has both a binary flash memory and a multi-value flash memory and stores management data in the binary flash memory and user data in the multi-value flash memory (see e.g. Japanese Patent Laid-Open Publication No. 2001-306393). Furthermore, there has been proposed a data storage system in which flash memories of a plurality of types or binary and multi-value types are used such that memory areas of the respective types can be distinguishably accessed according to the intended purpose of use (see e.g. Japanese Patent Laid-Open Publication No. H11-31102).

In a case where a flash memory is used as a storage medium of a digital camera, a host system stores image files in the flash memory using a FAT file system. In the FAT file system, the flash memory is divided into a file allocation table, a directory entry area, and a data area, for use. The file allocation table and the directory entry area are areas to be accessed in any file access. Particularly in a large-capacity storage medium, the frequency of access to these two areas tends to increase, and hence the speed of access to these areas largely influences file access speed.

On the other hand, there is a demand for arranging specific files in a high-speed area. For example, when a large number of files are managed e.g. in a digital camera, a management file, called a catalog file, for managing the storage relation between directories and files is generated (see e.g. Japanese Patent Laid-Open Publication No. H09-44394). This management file is frequently referred to or recorded for newly generating photographed images and image browsing. Further, since the management file stores information for determining the number of a file to be generated next e.g. when the power of the digital camera is turned on, access to the management file is absolutely necessary immediately after power-on so as to determine whether or not first shooting can be executed. Therefore, it is preferable to dispose the data area of the management file in the high-speed area so as to speed up shooting operation and reproduction operation as well as to reduce time required after power-on to enable shooting.

However, the data storage system disclosed in Japanese Patent Laid-Open Publication No. H11-31102 is configured such that a host system accesses a high-speed area or a low-speed area while distinguishing between the two areas using an address as viewed from the host system. For this reason, in a case where the host system writes data at a desired access speed, addresses for data storage are limited.

Further, when the FAT file system is used, the file allocation table and the directory entry area to be preferably located in the high-speed area are disposed at arbitrary addresses according to the capacity of a medium, a format, and the status of files.

For this reason, in a case where the locations of a high-speed area and a low-speed area are fixed by respective addresses as in the above-mentioned data storage system, an arbitrary area to be used in the FAT file system cannot be located in the high-speed area.

On the other hand, in order to enable a client of the file system to dispose a desired file in the high-speed area, the FAT file system is required to provide a special command. Further, this method is undesirable for the interface of a file system assuming the use of a generally standard interface.

Furthermore, even if the interface of the FAT file system is provided with a command for disposing a desired file in the high-speed area, the client of the file system cannot always recognize or discriminate a file to be accessed at a high speed as such. Therefore, it is difficult to dispose a file to be accessed at a high speed in the high-speed area.

SUMMARY OF THE INVENTION

The present invention provides a memory management device and method which is capable of allocating a memory unit accessible at a higher speed to data which is stored in a storage device having memory units different in access speed, without being limited in an storage area, a program for implementing the memory management method, and a memory management system.

In a first aspect of the present invention, there is provided a memory management device comprising a first memory unit configured to be accessible at a predetermined access speed, a second memory unit configured to be accessible at a lower access speed than the predetermined access speed, a control unit configured to manage the first and second memory units in units of data-holding units each formed by a plurality of physical pages and write data in the physical pages, and a storage unit configured to store page allocation information in which logical pages designated when writing the data and the physical pages are associated with each other, wherein the control unit is operable when writing data in one of the first memory unit and the second memory unit, to write the data in the first memory unit based on the page allocation information corresponding to the designated logical pages.

According to the first aspect of the present invention, when writing data in a storage device having memory units different in access speed, it is possible to allocate a storage area accessible at a high speed to the data without limiting addresses where the data is to be written.

The control unit can designate the predetermined access speed as an access speed in the page allocation information, thereby causing the data to be written in the first memory unit.

The memory management device further comprises an access frequency-determining unit configured to determine a frequency of access to the logical pages, and when the access frequency-determining unit determines that the access frequency is high, the control unit can designate the predetermined access speed as an access speed in the page allocation information, thereby causing the data to be written in the first memory unit.

The memory management device further comprises a determination unit configured to determine, based on the page allocation information, whether or not the logical pages have associated ones of the physical pages allocated thereto, a change unit configured to change physical pages for formerly holding data of the logical pages which are determined by the determination unit to have the associated physical pages allocated thereto, to erasure waiting pages, and a garbage collection unit configured to be operable when an erasure waiting page count exceeds a threshold value, to move the data written in the physical pages to other physical pages and carry out a garbage collection process for changing management information on an associated one of the data-holding units to thereby bring the physical pages into an erased state.

The garbage collection unit can carry out the garbage collection process whenever writing of the data is performed.

The garbage collection unit can periodically carry out the garbage collection process as a background process.

The control unit is operable when data written in the physical pages is to be moved to other physical pages by the garbage collection unit, to designate an access speed for the logical pages before moving of the data as an access speed for the logical pages to which the other physical pages are allocated.

The control unit is operable when data written in the physical pages is to be moved to other physical pages by the garbage collection unit, to designate an access speed for the logical pages to which the other physical pages are allocated according to a frequency of access to the logical pages.

The control unit is operable when the access speed is designated for the logical pages, to write the data associated with the logical pages in the physical pages to which the data is to be moved, and updates the page allocation information.

In a second aspect of the present invention, there is provided a memory management method comprising a management step of managing a first memory unit configured to be accessible at a predetermined access speed and a second memory unit configured to be accessible at a lower access speed than the predetermined access speed, in units of data-holding units each formed by a plurality of physical pages, a storage step of storing page allocation information in which logical pages designated when writing the data and the physical pages are associated with each other, in one of the first memory unit and the second memory unit, and a writing step of writing, when writing data in one of the first memory unit and the second memory unit, the data in the first memory unit based on the page allocation information corresponding to the designated logical pages.

In a third aspect of the present invention, there is provided a computer readable program for causing a computer to execute a memory management method, wherein the program comprises a management module for managing a first memory unit configured to be accessible at a predetermined access speed and a second memory unit configured to be accessible at a lower access speed than the predetermined access speed, in units of data-holding units each formed by a plurality of physical pages, a storage module for storing page allocation information in which logical pages designated when writing the data and the physical pages are associated with each other, in one of the first memory unit and the second memory unit, and a writing module for writing, when writing data in one of the first memory unit and the second memory unit, the data in the first memory unit based on the page allocation information corresponding to the designated logical pages.

In a fourth aspect of the present invention, there is provided a memory management system connected to a memory management device, comprising a host system configured to have a predetermined file system operating thereon, the memory management device including a first memory unit configured to be accessible at a predetermined access speed, a second memory unit configured to be accessible at a lower access speed than the predetermined access speed, a control unit configured to manage the first and second memory units in units of data-holding units each formed by a plurality of physical pages and write data in the physical pages, and a storage unit configured to store page allocation information in which logical pages designated when writing the data and the physical pages are associated with each other, the control unit being operable when writing data in one of the first memory unit and the second memory unit, to write the data in the first memory unit based on the page allocation information corresponding to the designated logical pages, and the host system is operable when formatting by the predetermined file system, to designate the first memory unit as a management area used by the predetermined file system.

In a fifth aspect of the present invention, there is provided a memory management system connected to a memory management device, comprising a host system configured to have a predetermined file system operating thereon, the memory management device including a first memory unit configured to be accessible at a predetermined access speed, a second memory unit configured to be accessible at a lower access speed than the predetermined access speed, a control unit configured to manage the first and second memory units in units of data-holding units each formed by a plurality of physical pages and write data in the physical pages, and a storage unit configured to store page allocation information in which logical pages designated when writing the data and the physical pages are associated with each other, the control unit being operable when writing data in one of the first memory unit and the second memory unit, to write the data in the first memory unit based on the page allocation information corresponding to the designated logical pages, and the host system is operable when generating files and directories by the predetermined file system, to designate the first memory unit as a management area used by the predetermined file system.

The features and advantages of the invention will become more apparent from the following detailed description taken in conjunction with the accompanying drawings.

BRIEF DESCRIPTION OF THE DRAWINGS

FIG. 5 is a diagram of a list of commands supported by a storage device.

FIG. 13 is a diagram showing conditions for speed designation.

DETAILED DESCRIPTION OF THE EMBODIMENTS

The present invention will now be described in detail with reference to the drawings showing a preferred embodiment thereof.

Figure 1:
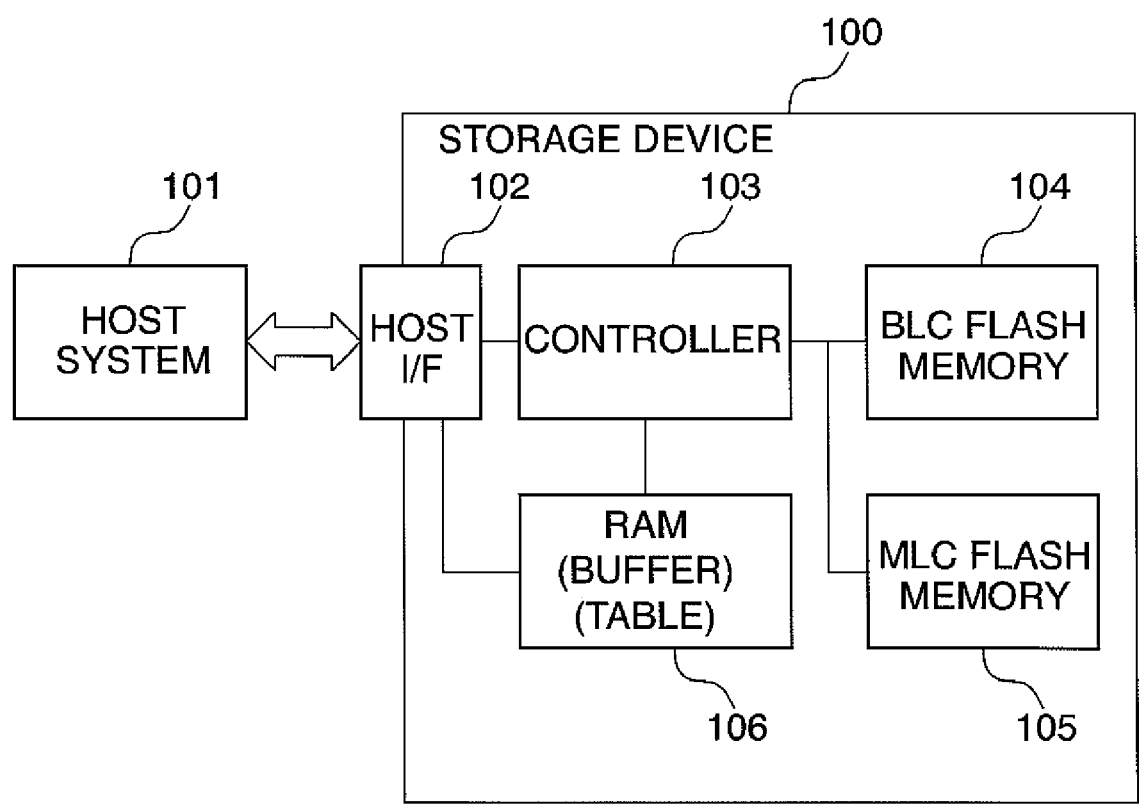
FIG. 1 is a block diagram of a memory management system including a memory management device according to a first embodiment of the present invention.

FIG. 1 is a block diagram of a memory management system including a memory management device according to a first embodiment of the present invention.

As shown in FIG. 1, the memory management system is comprised of a host system 101, and a storage device 100, for example. The host system 101 incorporates a file system, not shown, and a block device driver, not shown, The host system 101 is implemented e.g. by a CPU (Central Processing Unit) of an apparatus, such as a digital camera which the storage device 100 can be incorporated in or attached to. The storage device 100 serves as a block device for the host system 101. A block device is a storage medium into which is input data blocks each formed by a plurality of bytes as units, and is implemented e.g. by a flash memory.

The storage device 100 is comprised of a host interface (interface) 102, a controller 103, a BLC (Binary Level Cell: binary type) flash memory 104, an MLC (Multi-Level Cell: multi-value type) flash memory 105, and a RAM 106.

The host interface (interface) 102 is connected to the host system 101, the controller 103, and the RAM 106. The host interface 102 controls a bus connecting between the storage device 100 and the host system 101, and the reading/writing of data in/from a buffer provided in the RAM 106.

The controller 103 is connected to the BLC flash memory 104, the MLC flash memory 105, and the RAM 106. The controller 103 controls the flash memories 104 and 105 within the storage device 100, and manages a logical page allocation table, described hereinafter, and so forth.

The access speed of the MLC flash memory 105 is lower than that of the BLC flash memory 104. The RAM 106 is used as a buffer for data transfer between the storage device 100 and the host system 101 as well as a means for holding the logical page allocation table and the like.

Next, the memory map of the BLC flash memory 104 and that of the MLC flash memory 105 will be described with reference to FIGS. 2A and 2B.

Figure 2A:
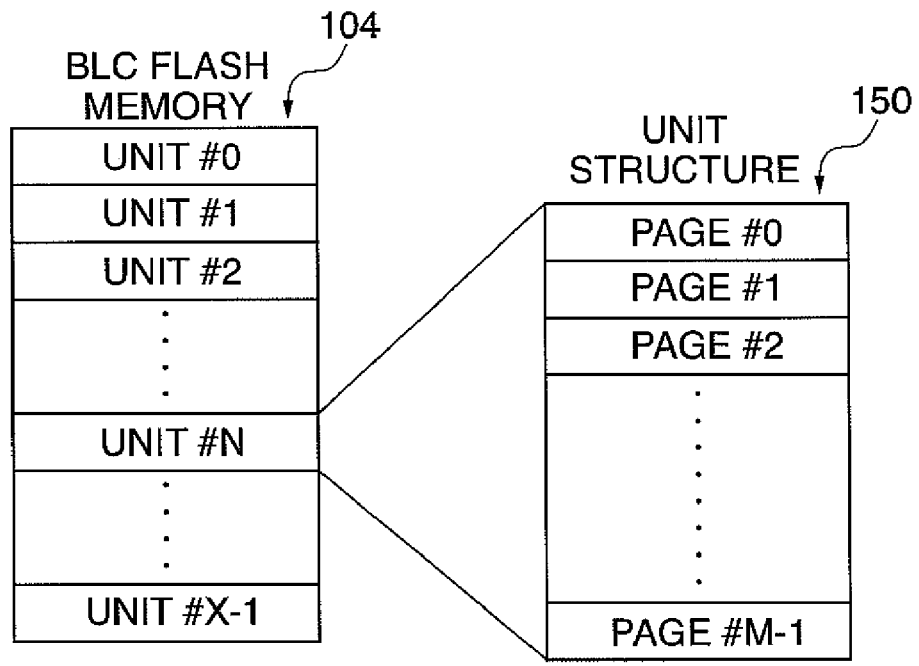
FIG. 2A is a schematic diagram of a memory map of a BLC flash memory appearing in FIG. 1.
Figure 2B:
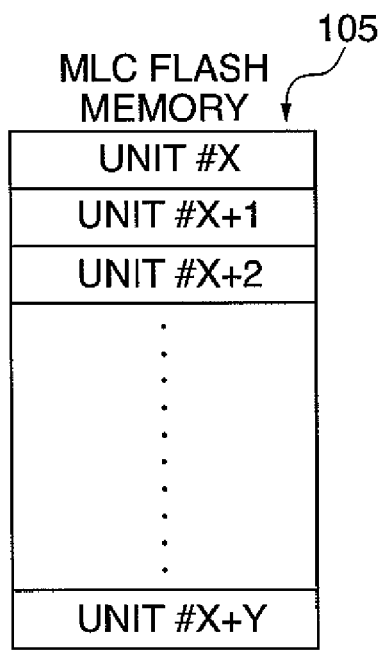
FIG. 2B is a schematic diagram of a memory map of an MLC flash memory appearing in FIG. 1.

FIGS. 2A and 2B are diagrams illustrating the respective memory maps of the flash memories appearing in FIG. 1, in which FIG. 2A shows the memory map of the BLC flash memory 104, and FIG. 2B shows that of the MLC flash memory 105.

Each of the BLC flash memory 104 and the MLC flash memory 105 is managed in units of a plurality of erasable blocks (e.g. pages #0 to #M−1). The BLC flash memory 104 has X units #0 to #X−1. The MLC flash memory 105 has Y units #X to #X+Y. Each unit has an inside thereof divided into M physical pages (physical blocks) #0 to #M−1 for management, as shown by a unit structure 150 in FIG. 2A. A physical page is a contiguous sequence of bytes of data for use as a block device. In general, 512 bytes multiplied by an integer are managed as one page. The storage device 100 in the present embodiment contains ((X+Y)×M) physical pages.

Next, a description will be given of a unit management table for managing the attribute information of each of the above-mentioned units.

Figure 3:
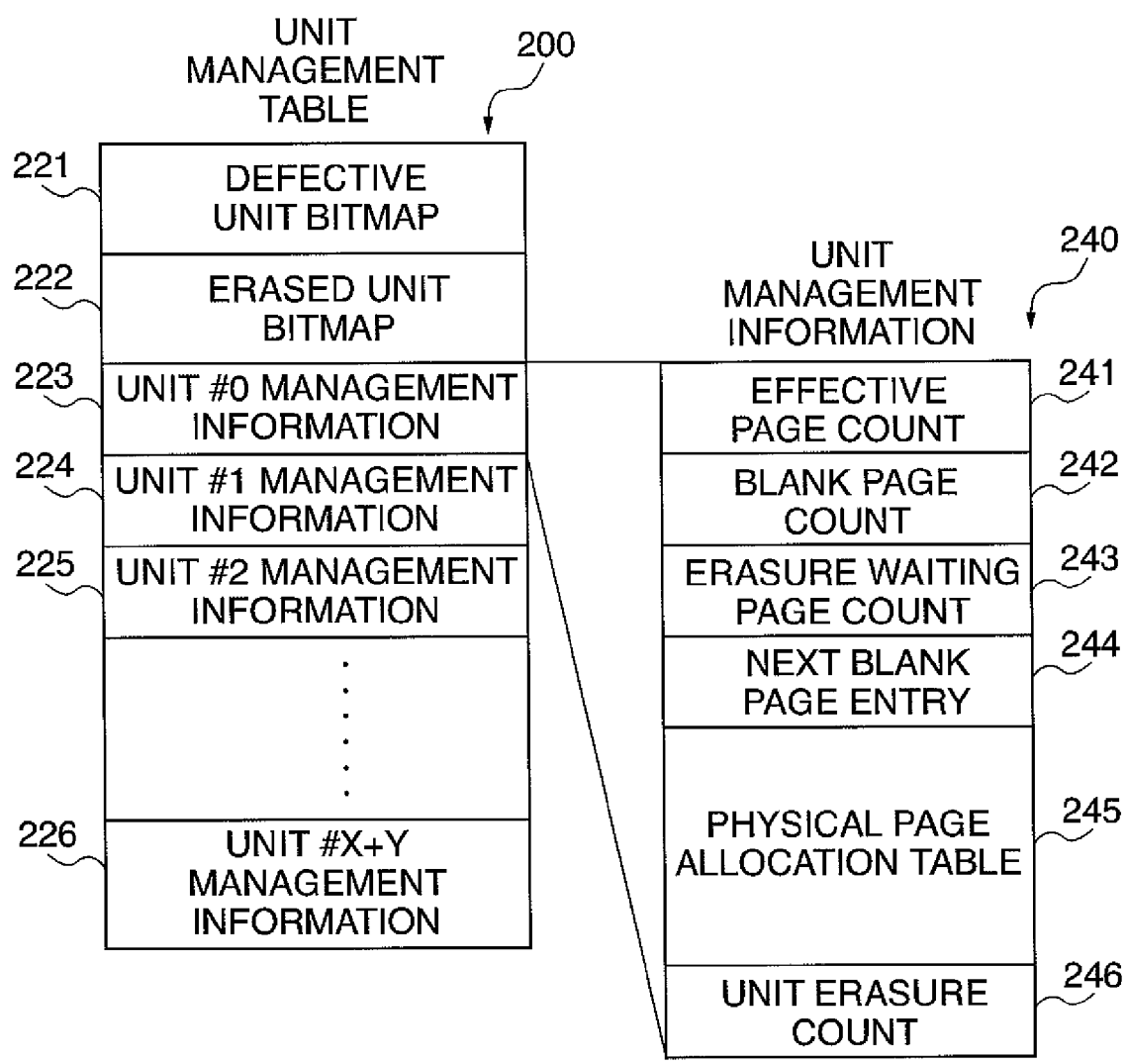
FIG. 3 is a schematic diagram illustrating details of a unit management table.

FIG. 3 is a schematic diagram illustrating details of the unit management table.

The unit management table 200 is management information for managing all the units in the BLC flash memory 104 and the MLC flash memory 105, and is stored in a predetermined unit in the BLC flash memory 104.

The unit management table 200 includes a defective unit bitmap 221 and an erased unit bitmap 222. The defective unit bitmap 221 stores information on defective units among all the units (X+Y units #0 to #X+Y) in the BLC flash memory 104 and the MLC flash memory 105, as bit values. The erased unit bitmap 222 stores information on erased units among all the units in the BLC flash memory 104 and the MLC flash memory 105, as bit values.

Further, the unit management table 200 stores unit management information items (unit #0 management information 223 to unit #X+Y management information 226) associated with the respective units in the BLC flash memory 104 and the MLC flash memory 105.

Unit management information 240 shown in FIG. 3A by way of example is one of the unit management information items, i.e. the unit #0 management information 223 to the unit #X+Y management information 226. The unit management information 240 is comprised of an effective page count 241, a blank page count 242, an erasure waiting page count 243, a next blank page entry 244, a physical page allocation table 245, and a unit erasure count 246.

The effective page count 241 indicates the number of effective pages in a unit. The blank page count 242 indicates the number of writable blank pages which have not been allocated, out of the effective pages. The erasure waiting page count 243 indicates the number of physical pages left in an erasure wait state after having data once written therein and then having been overwritten or having the data transferred to another blank page. A process in which erasure waiting pages are produced will be described hereinafter. The next blank page entry 244 indicates the entry number (address) of a blank page to be allocated next in the unit.

The physical page allocation table 245 indicates which physical pages arranged on the unit are allocated to which numbers of logical pages (logical blocks), respectively. In the present embodiment, each unit is comprised of M pages, and hence the physical page allocation table 245 is configured to have M entries (address areas). When an entry in the physical page allocation table 245 is 0xFFFFFFFF, it is indicated that an associated physical page is a blank page. Further, when an entry in the physical page allocation table 245 is 0xFFFFFFF0, it is indicated that an associated physical page is an erasure waiting page. Each of entry numbers 0x00000000 to 0xFFFFFF00 of the physical page allocation table 245 indicates a logical page number (logical address) of a logical page to which an associated physical page is allocated.

The unit erasure count 246 indicates the number of times of erasure of an associated unit. The unit erasure counts are used so as to manage the logical pages and the allocation of the units such that the erasure counts of the respective units are equalized.

Next, a description will be given of the logical page allocation table.

Figure 4:
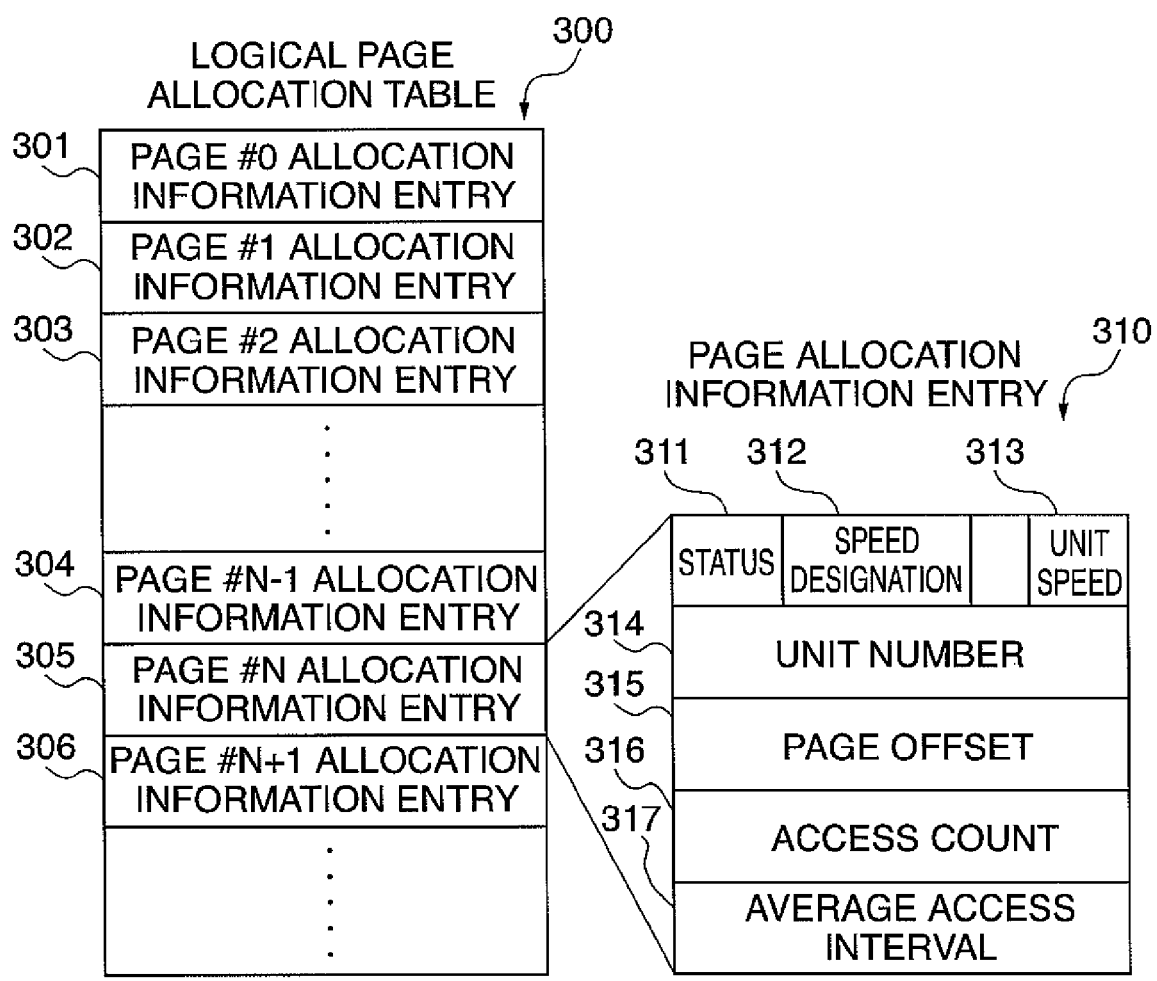
FIG. 4 is a schematic diagram illustrating details of a logical page allocation table.

FIG. 4 is a schematic diagram illustrating details of the logical page allocation table.

The logical page allocation table 300 stores information on logical pages for use in storage service to be provided for the host system 101 by the storage device 100. The logical page allocation table 300 is stored in a predetermined unit in the BLC flash memory 104. In the case of accessing the storage device 100, the host system 101 designates a logical page to thereby gain access to a predetermined physical page in the BLC flash memory 104 and/or the MLC flash memory 105.

The logical page allocation table 300 is comprised of a page #0 allocation information entry 301 to a page #N+1 allocation information entry 306, . . . , which are associated with respective pages #0 to #N+1, respectively. A page allocation information entry 310 indicates bit assignment of a page allocation information entry.

A status 311 in the page allocation information entry 310 is a bit value indicative of the state of allocation of a physical page to a logical page. The value of 1 indicates an allocated state, and the value of 0 an unallocated state. An unallocated logical page means a logical page in which no data has ever been written by the host system 101 after initialization. When the host system 101 attempts to read out data from the unallocated logical page, the controller 103 fills the read page buffer in the RAM 106 with a value of 0xFF and delivers the data to the host system 101.

A speed designation 312 is a bit value indicative of a designated speed of a logical page which the user can designate. The value of 0 indicates "no speed designation", while the value of 1 indicates "designation of high speed". A unit speed 313 is a bit value indicative of the speed of a unit within which exists a physical page allocated to the logical page.

The value of 0 indicates a low-speed unit, and the value of 1 a high-speed unit. In the present embodiment, the low-speed unit corresponds to a unit in the MLC flash memory 105, and the high-speed unit corresponds to a unit in the BLC flash memory 104. This speed designation makes it possible to selectively assign a desired physical page to a high-speed unit or a low-speed unit. A speed in the speed designation 312 can be designated by the user in advance.

A unit number 314 is assigned to a unit containing the physical page currently allocated to (associated with) the logical page. A page offset 315 indicates a page offset number in the unit of the physical page allocated to the logical page. An access count 316 stores a value indicative of the number of times of access to the logical page. An average access interval 317 stores an average time period of access intervals at which the page is accessed. The access count 316 and the average access interval 317 are used to determine page access frequency, referred to hereinafter.

The controller 103 converts a logical page number (logical address) designated by the host system 101 into an address based on the contents of the logical page allocation table. Then, data is read out or written from/into the BLC flash memory 104 or the MLC flash memory 105, or data in the BLC flash memory 104 or the MLC flash memory 105 is erased, using a physical page number (physical address) corresponding to the converted address.

Next, a description will be given of commands for use in communication between the host system 101 and the storage device 100.

FIG. 5 is a diagram of a list of the commands supported by the storage device 100.

The storage device 100 supports four commands of "Initialize", "Page read", "Page write", and "Page rate" as the commands issued from the host system 101. Each of the commands is used along with 0 to 3 parameters.

The "Initialize" command is designated by a command number 0x00. The "Initialize" command is used for initializing the whole area of the storage device, without any parameters, as shown in FIG. 5.

The "Page read" command is designated by a command number 0x10. The "Page read" command is used for reading out data from a designated logical page.

The "Page read" command has a first parameter specifying a start logical page number for designating a read start position and a second parameter specifying a read page count. The host system 101 transmits the "Page read" command and the parameters, and then receives predetermined read data from the storage device 100.

The "Page write" command is designated by a command number 0x20. The "Page write" command is used for writing data in a designated logical page.

The "Page write" command has a first parameter specifying a start logical page number for designating a write start position and a second parameter specifying a write page count. The host system 101 transmits the "Page write" command and the parameters, and then predetermined write data to the storage device 100.

The "Page rate" command is designated by a command number 0x40. The "Page rate" command is used for designating an access speed for designated logical pages. The "Page rate" command has a first parameter specifying the page number of a start logical page for which the access speed is designated, a second parameter specifying a page count of pages for which the access speed is designated, and a third parameter specifying the access speed. The access speed as the third parameter is set to 1 to designate a high speed, or to 0 to designate a normal speed.

Next, a description will be given of an initialization process for the storage device 100.

In the case of using the storage device 100, first, the initialization process is executed. Normally, the initialization process is executed before shipment from a factory where the storage device is manufactured.

The host system 101 transmits the "Initialize" command appearing in FIG. 5 to the storage device 100. In the storage device 100, the controller 103 receives the "Initialize" command via the host interface 102 and starts the initialization process.

Figure 6:
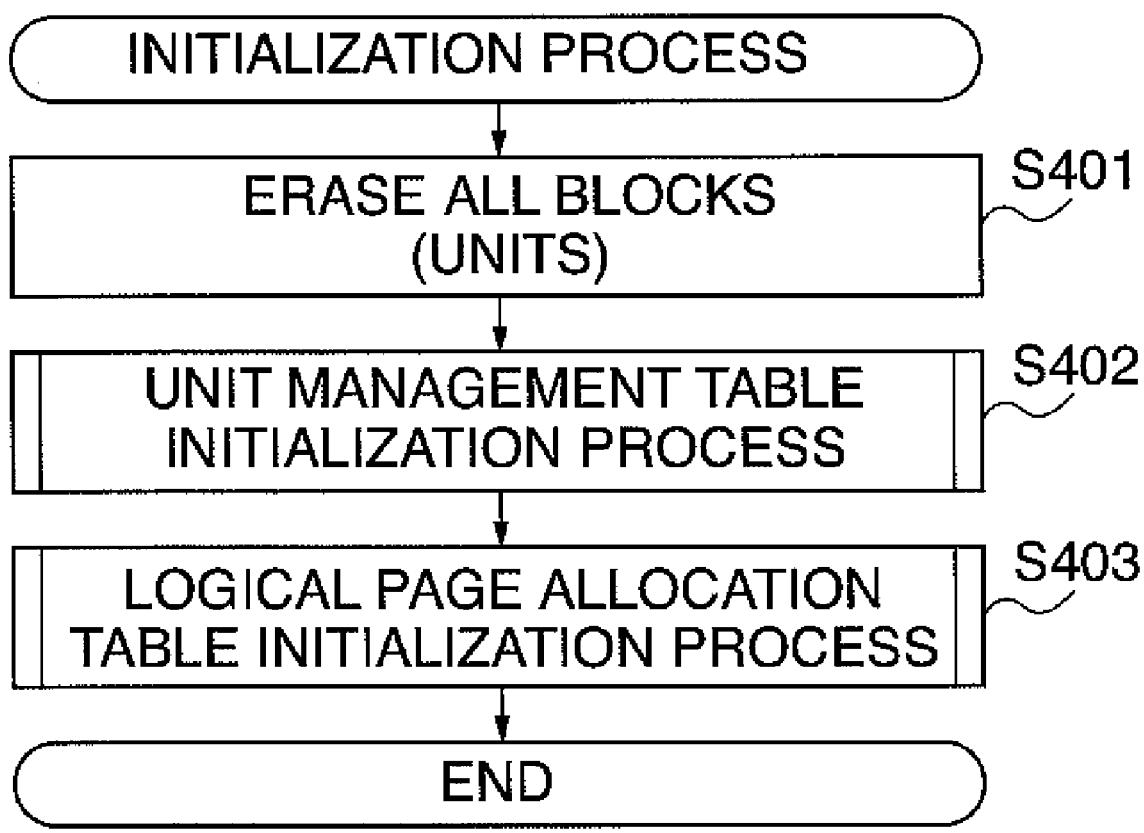
FIG. 6 is a flowchart of a storage device initialization process which is executed by a controller.

FIG. 6 is a flowchart of the initialization process for the storage device 100, which is executed by the controller 103.

The controller 103 erases all the blocks (units) in the BLC flash memory 104 and the MLC flash memory 105 (step S401). Next, the controller 103 initializes the unit management table 200 (step S402). Then, the controller 103 initializes the logical page allocation table 300 (step S403), followed by terminating the present process.

Now, the initialization process for the unit management table 200, which is executed in the step S402, will be described in detail with reference to FIG. 7.

Figure 7:
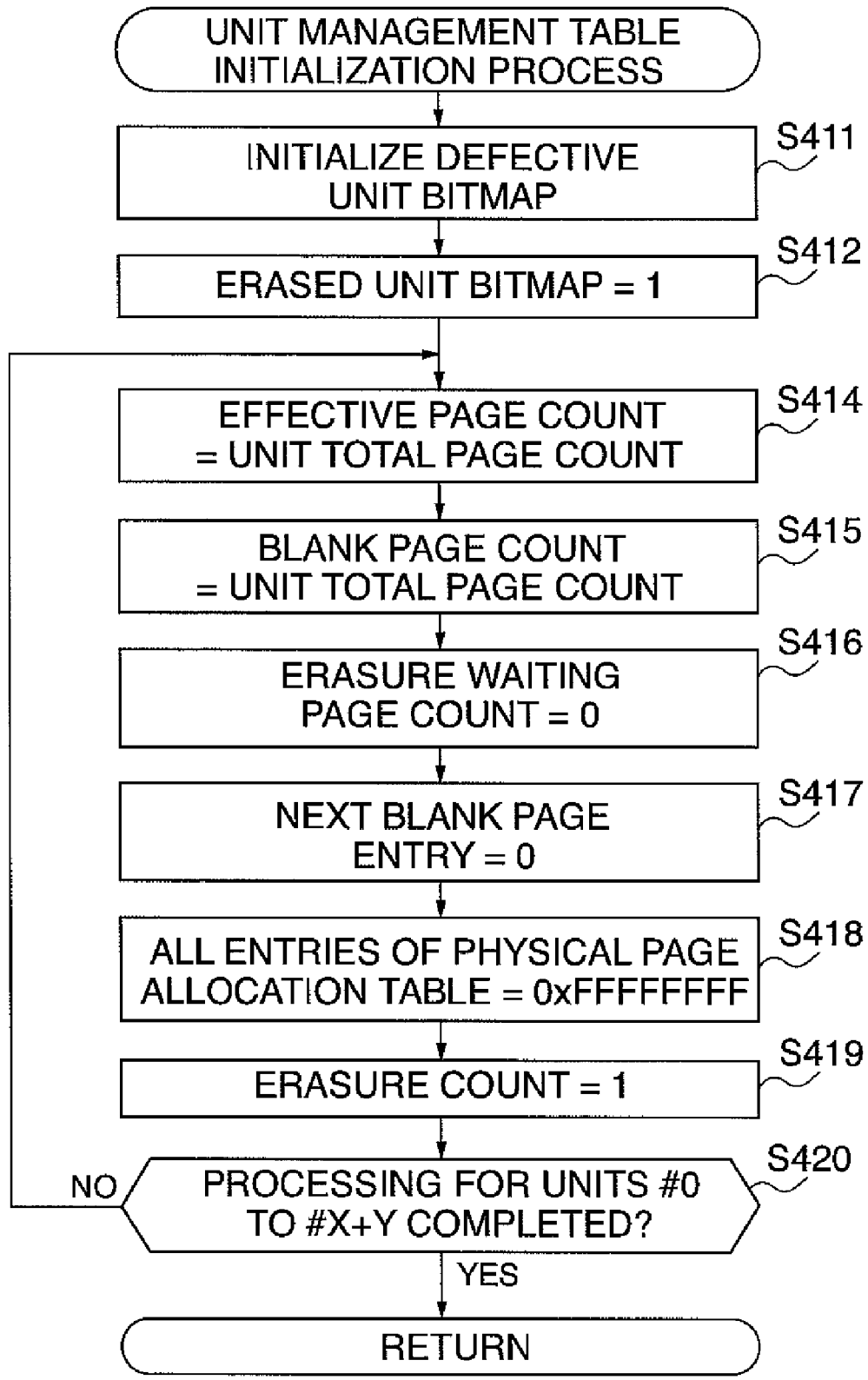
FIG. 7 is a flowchart of a unit management table initialization process which is executed in a step S402 in FIG. 6.

FIG. 7 is a flowchart of the initialization process for the unit management table 200.

First, the controller 103 initializes the defective unit bitmap 221 (step S411). Then, the erased unit bitmap 222 is all set to 1, whereby all the units are brought into an erased state (step S412).

Next, the steps S414 to S420 are repeatedly carried out to thereby initialize the unit management information 240 associated with all the units. First, the controller 103 sets the effective page count 241 to the total page count of a unit (step S414) and then sets the blank page count 242 to the total page count (S415).

Next, the controller 103 sets the erasure waiting page count 243 to 0 (step S416), and then sets the next blank page entry 244 to 0 (step S417). Thereafter, the controller 103 sets all the entries of the physical page allocation table 245 to 0xFFFFFFFF (step 8418), and sets the unit erasure count 246 to 1 (step 8419). In a case where erasure is first executed before shipment from a factory, the controller 103 sets the unit erasure count 246 to 1, whereas in a case where the present process is executed after shipment from a factory, the unit erasure count 246 is set to a value obtained by incrementing the existing value by 1. Then, the controller 103 determines whether or not the processing has been executed for all the units #0 to #X+Y (step S420), and if all the units have undergone the processing, the process returns to the main routine.

Next, the logical page allocation table initialization process executed in the step S403 in FIG. 6 will be described with reference to FIG. 8.

Figure 8:
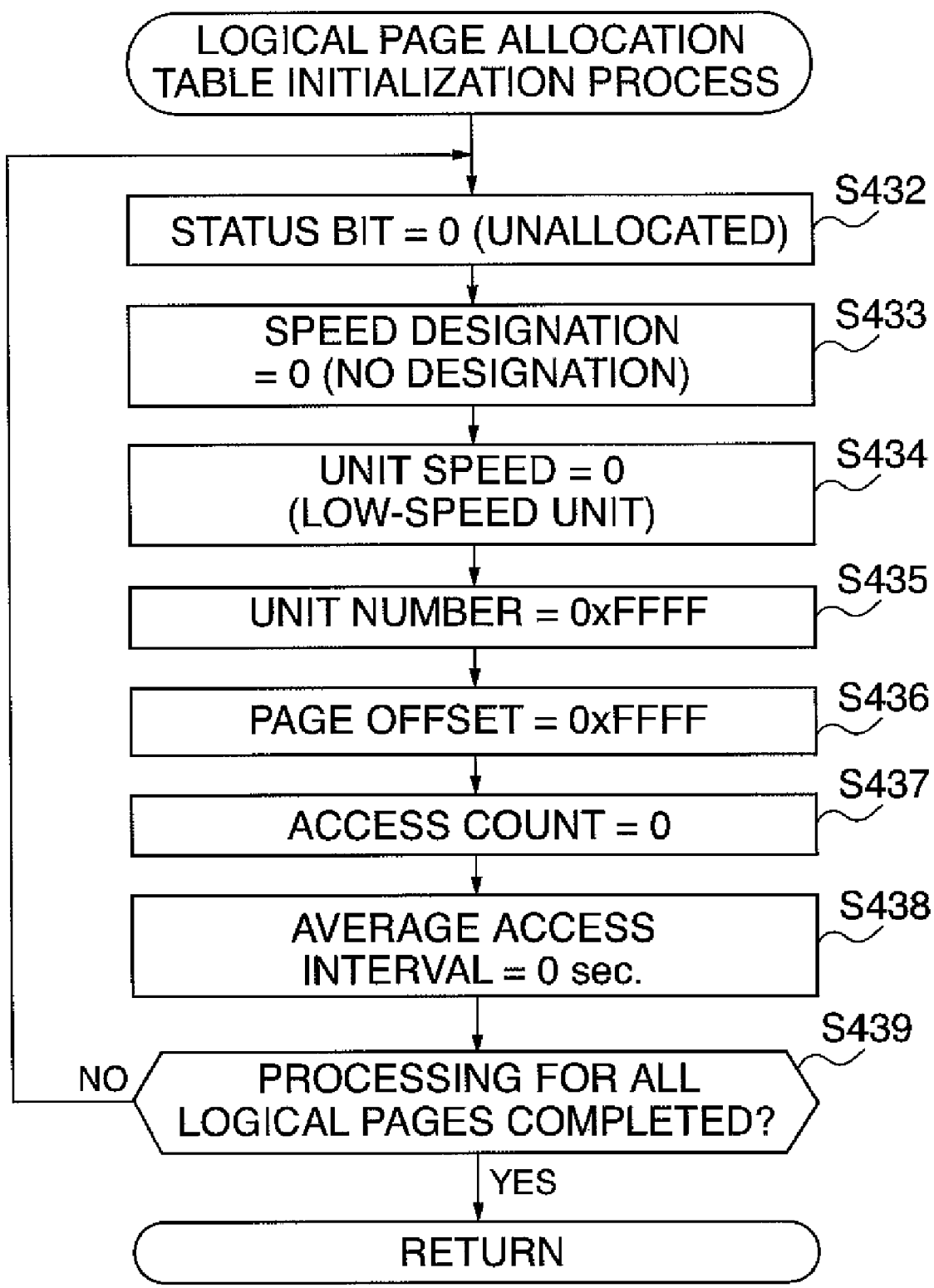
FIG. 8 is a flowchart of a logical page allocation table initialization process which is executed in a step S403 in FIG. 6.

FIG. 8 is a flowchart of the initialization process for the logical page allocation table 300, which is executed in the step S403 in FIG. 6.

Steps S432 to S439 are repeatedly carried out to thereby initialize the page allocation information entries 310 (e.g. the page #0 allocation information entry 301 to the page #2 allocation information entry 303) of all the logical pages.

First, the controller 103 sets the bit value of the status 311 to 0 (i.e. an unallocated state) (step S432), the bit value of the speed designation 312 to 0 (no designation) (step S433), and the bit value of the unit speed 313 to 0 (low-speed unit) (step S434). Then, the controller 103 sets the unit number 314 to 0xFFFF (step S435), and the page offset 315 to 0xFFFF (step S436). Further, the controller 103 sets the value of the access count 316 to 0 (step S437), and the value of the average access interval 317 to 0 sec. (0xFFFF) (step S438). Thereafter, the controller 103 determines whether or not the processing has been executed for all the pages (step S439), and if the page allocation information entries 310 of all the logical pages have undergone the processing, the process returns to the main routine.

Next, a description will be given of a flow of a process executed in a case where the host system 101 reads out data from the storage device 100.

The host system 101 transmits the "Page read" command appearing in FIG. 5 to the storage device 100. The "Page read" command is sent along with the parameters "start logical page number" and "page count".

In the storage device 100, the controller 103 receives the "Page read" command and the parameters "start logical page number" and "page count" via the host interface 102 and starts a data reading process. The controller 103 designates logical pages from which data is to be read, based on the parameters "start logical page number" and "page count" received together with the "Page read" command.

Figure 9:
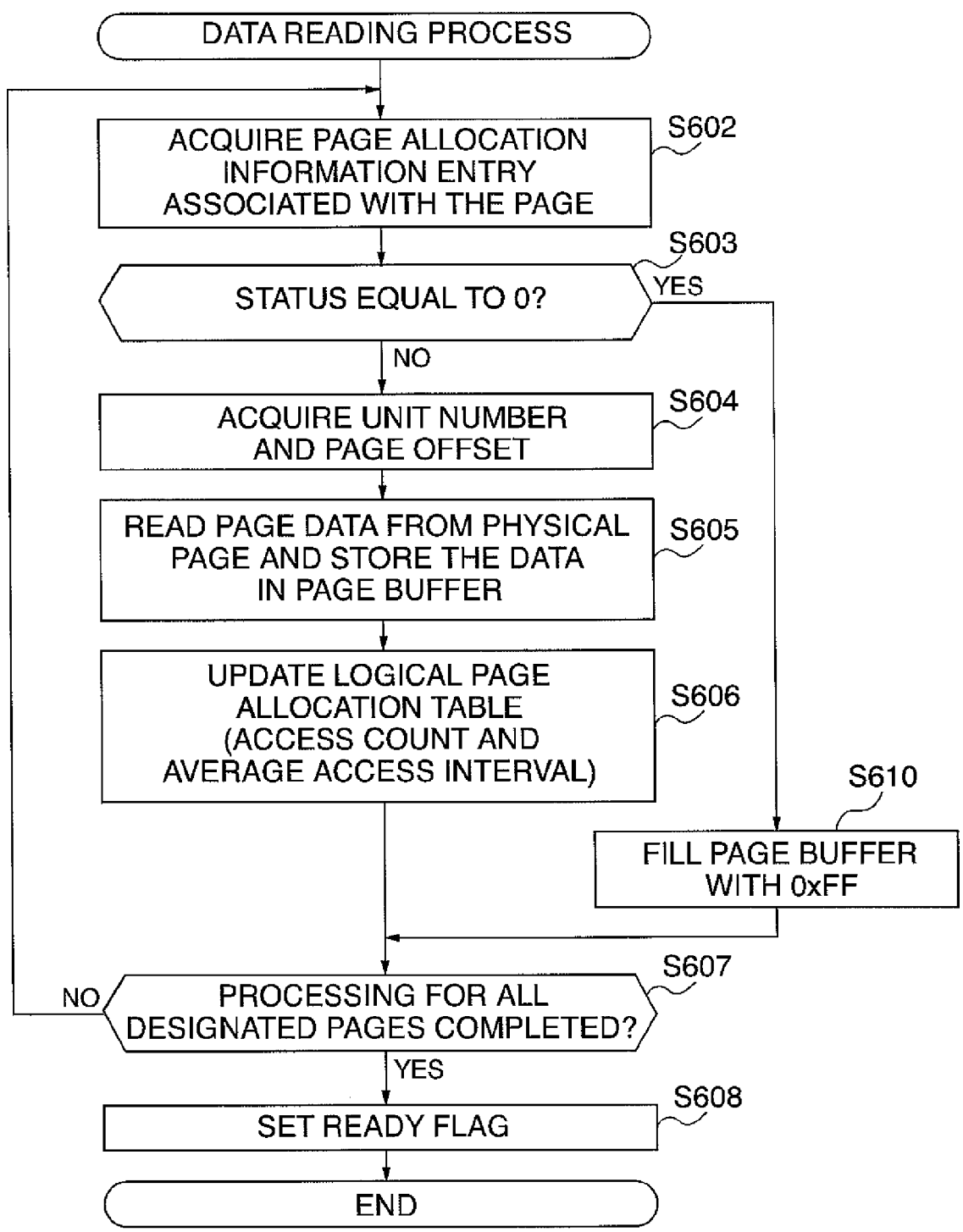
FIG. 9 is a flowchart of a data reading process which is executed by the controller.

FIG. 9 is a flowchart of the data reading process executed by the controller 103.

Steps S602 to S607 are executed for all logical pages designated based on the parameters "start logical page number" and "page count" of the "Page read" command.

First, the controller 103 acquires the page allocation information entry 310 of a designated logical page from the logical page allocation table 300 (step S602) Then, the controller 103 determines whether or not the bit value of the status 311 of the acquired page allocation information entry 310 is equal to 0 (step S603). If the bit value of the status 311 is equal to 0, it is judged that the logical page is unallocated, and the process proceeds to a step S610. On the other hand, if the bit value of the status 311 is equal to 1, it is judged that the logical page has a physical page allocated thereto, and the process proceeds to a step S604.

In the step S610, a page buffer area provided on the RAM 106 for reading the logical page is filled with 0xFF. More specifically, since data has never been written in the unallocated logical page, the value of 0xFF indicative of the erased state of a portion of the flash memory is returned as a value of each of all bytes.

In the step S604, the value of the unit number 314 and that of the page offset 315 are acquired from the page allocation information entry 310 (step S604). Then, the location of a physical page in the BLC flash memory 104 or the MLC flash memory 105, which corresponds to the acquired values of the unit number and the page offset, is identified, and page data is read out from the identified physical page. The read-out page data is stored in a read page buffer for reading the logical page (step S605). The read page buffer is secured in the RAM 106.

Next, the value of the access count 316 of the page allocation information entry 310 associated with the page data in the logical page allocation table 300 is incremented by 1, and the value of the average access interval 317 is updated (step S606). Then, when the steps S602 to S607 including proceeding through the step S610 are completed for all the designated logical pages to complete data reading therefrom, the process exits from the loop to proceed to a step S608 (YES to the step S607).

Then, the controller 103 sets a ready flag for the host interface 102 (step S608), followed by terminating the present process. When the ready flag is set, communication between the host system 101 and the host interface 102 is started, and data of the designated pages is transferred.

Next, a description will be given of a process executed in a case where the host system 101 writes data in the storage device 100.

The host system 101 transmits the "Page write" command appearing in FIG. 5 to the storage device 100. The "Page write" command is sent along with the parameters "start logical page number" and "page count" and write data to be written in the associated page.

In the storage device 100, the controller 103 receives the "Page write" command and the parameters "start logical page number" and "page count" via the host interface 102 and starts a data writing process. When receiving the write data to be written in the page after receiving the command and the parameters, the host interface 102 stores the write data in a page buffer area provided in the RAM 106 for writing the logical page.

Figure 10:
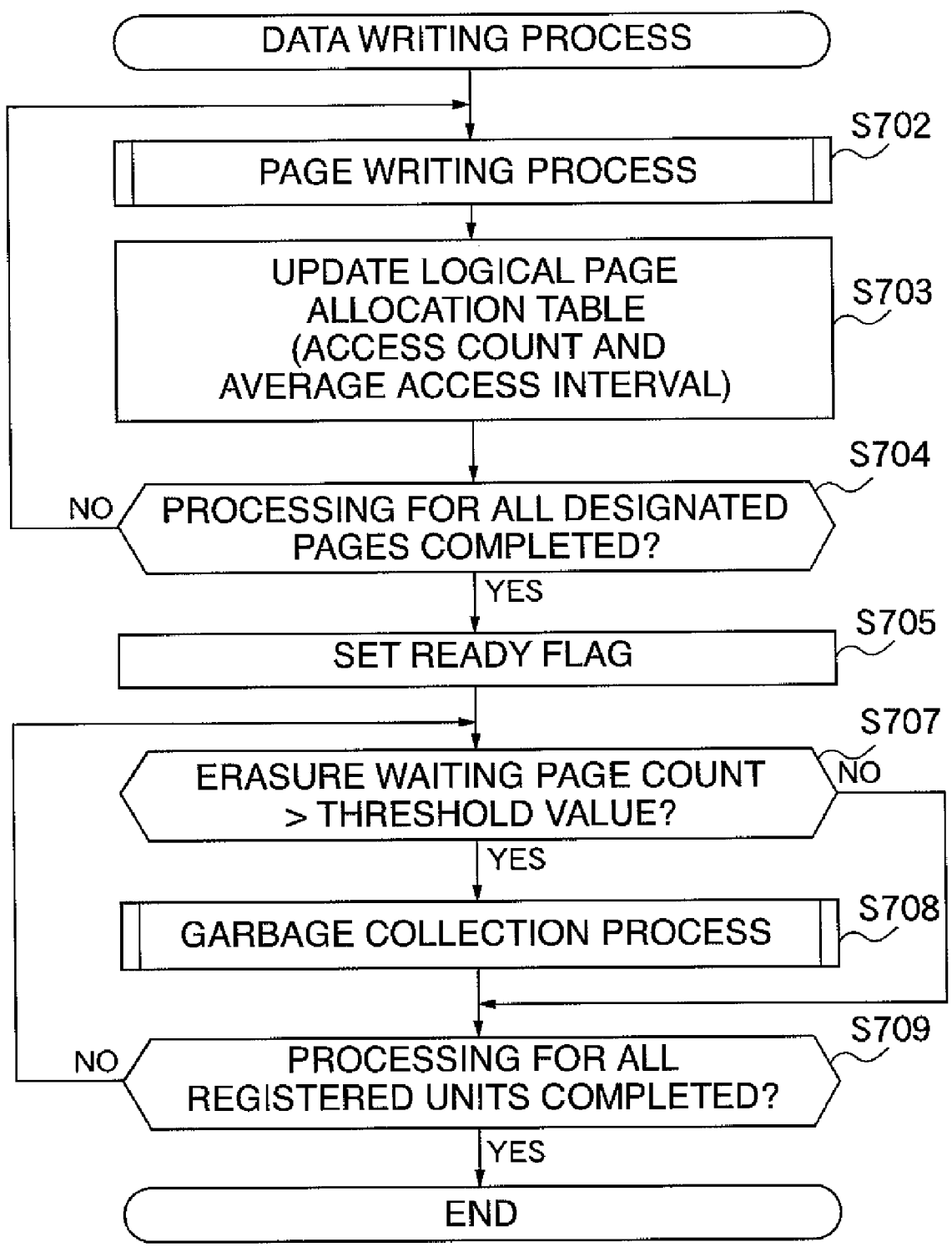
FIG. 10 is a flowchart of a data writing process which is executed by the controller.

FIG. 10 is a flowchart of the data writing process executed by the controller 103.

Steps S702 to S704 are executed for all logical pages designated based on the parameters "start logical page number" and "page count" of the "page write" command.

First, the controller 103 executes a page writing process, with a start logical page number of the logical pages and write data as arguments (step S702). The page writing process will be described in detail hereinafter.

When the page writing process in the step S702 is completed, the values of the access count 316 and the average access interval 317 of the page allocation information entry 310 associated with the logical page in the logical page allocation table 300 are updated (step S703). Then, when the steps S702 to S704 are completed for all the designated logical pages to complete data writing therein, the process exits from the loop to proceed to a step S705 (YES to the step S704).

Next, the controller 103 sets the ready flag for the host interface 102 (step S705) to thereby notify the host system 101 that the writing process has been completed. Then, steps S707 to S709 are executed for all units registered in a GC (garbage collection) queue generated in the page writing process in the step S702.

First, the value of the erasure waiting page count 243 is acquired by referring to the unit management information 240 of an associated unit, and the acquired value is compared with a preset threshold value (step S707). If the erasure waiting page count 243 is smaller than the threshold value (NO to the step S707), a garbage collection process (step S708), described hereinafter, is skipped, and the process proceeds to the step S709. On the other hand, if the erasure waiting page count 243 is larger than the threshold value (YES to the step S707), the garbage collection process (step S708) is executed, and then the process proceeds to the step S709. The garbage collection process is thus executed whenever data writing is performed on condition that the erasure waiting page count 243 is larger than the threshold value.

When the steps S706 to S709 are completed for all the units registered in the GC queue to complete the processing for them, the present process exits from the loop (YES to the step S709).

Next, the page writing process executed in the step S702 in FIG. 10 will be described in detail with reference to FIG. 11.

Figure 11:
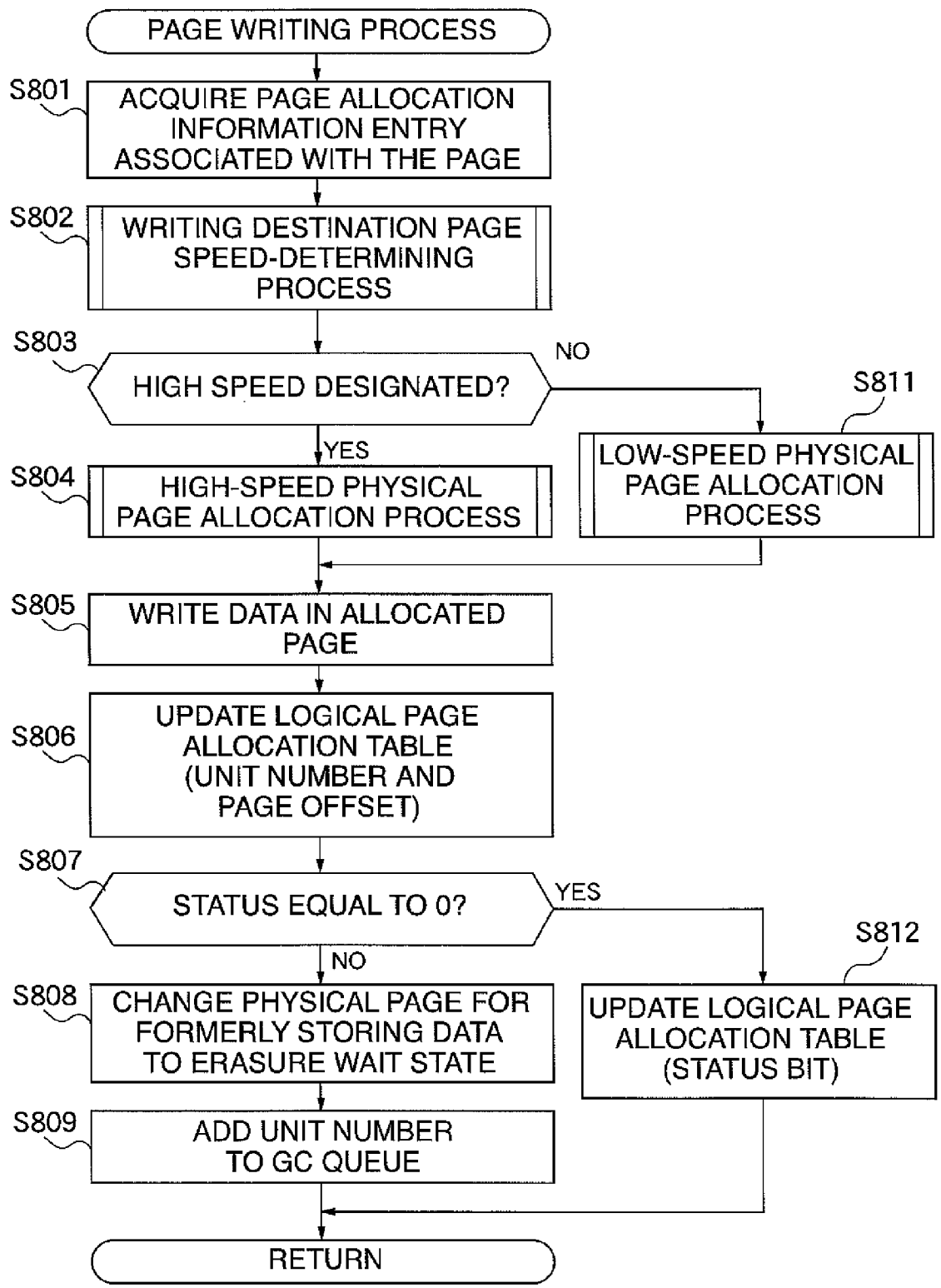
FIG. 11 is a flowchart of a page writing process which is executed in a step S702 in FIG. 10.

FIG. 11 is a flowchart of the page writing process executed in the step S702 in FIG. 10.

First, the controller 103 acquires the page allocation information entry 310 associated with the logical page from the logical page allocation table 300, with the start logical page number and write data of the logical page as arguments (step S801). Next, a writing destination page speed-determining process is executed based on the information of the acquired page allocation information entry 310 (step S802). This writing destination page speed-determining process will be described in detail hereinafter.

If a high-speed page is designated in the writing destination page speed-determining process in the step S802 (YES to a step S803), the process proceeds to a high-speed physical page allocation process in a step S804. On the other hand, if a low-speed page is designated or if nothing is designated in the writing destination page speed-determining process (NO to the step S803), the process proceeds to a low-speed physical page allocation process in a step S811.

In the high-speed physical page allocation process in the step S804, a physical page for page writing is allocated from the BLC flash memory 104, while in the low-speed physical page allocation process in the step S811, a physical page for page writing is allocated from the MLC flash memory 105. The physical page allocation processes in the respective steps S804 and S811 will be described in detail hereinafter.

Next, the controller 103 writes write data associated with the page, which is stored in the write page buffer in the RAM 106, in the physical page for which the access speed is designated (step S805). Then, the controller 103 writes values indicative of the location of the allocated physical page in the unit number 314 and the page offset 315 of the page allocation information entry 310 which corresponds to the page and is stored in the logical page allocation table 300, to thereby update the logical page allocation table 300 (step S806).

Next, the controller 103 determines whether or not the bit value of the status 311 of the acquired page allocation information entry 310 is equal to 0 (step S807). If the bit value of the status 311 is equal to 0, it is determined that the logical page is in the unallocated state, and the process proceeds to a step S812. On the other hand, if the bit value of the status 311 is equal to 1, it is determined that the logical page is in the allocated state, and the process proceeds to a step S808.

In the step S812, the controller 103 sets the bit value of the status 311 of the page allocation information entry 310 in the logical page allocation table 300 to 1, and then the process returns to the main routine of the data writing process. In the step S808, an entry in the physical page allocation table 245 of the unit management information 240, which is associated with a physical page for formerly storing the write data (formerly stored data), in a unit, is set to 0xFFFFFFF0. Further, the value of the erasure waiting page count 243 of the unit management information 240 is incremented by 1 to change the current state to an erasure wait state.

Then, the controller 103 adds the unit number of the unit to the GC queue to save the unit as a target unit for garbage collection (step S809), followed by the process returning to the main routine thereof.

Next, the writing destination page speed-determining process executed in the step S802 in FIG. 11 will be described in detail with reference to FIG. 12.

Figure 12:
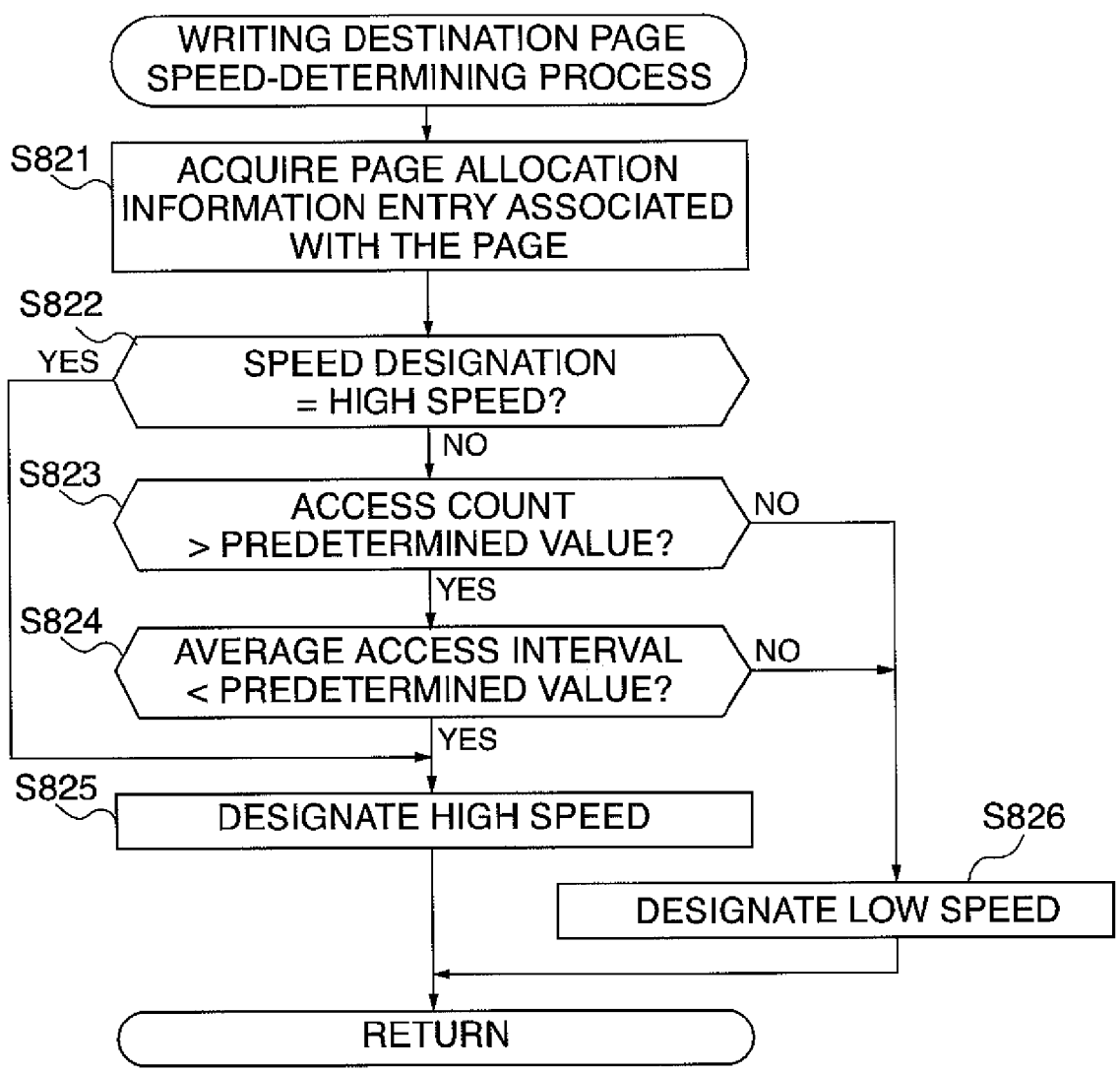
FIG. 12 is a flowchart of a writing destination page speed-determining process which is executed in a step S802 in FIG. 11.

FIG. 12 is a flowchart of the writing destination page speed-determining process executed in the step S802 in FIG. 11.

First, the controller 103 acquires a page allocation information entry 310 associated with a logical page as a data write destination from the logical page allocation table 300 (step S821).

Next, the controller 103 determines whether or not the bit value of the speed designation 312 of the acquired page allocation information entry 310 is equal to 1 (step S822). If the bit value of the speed designation 312 is equal to 1, the controller 103 judges that a high-speed page is designated in advance, and designates the logical page for data writing as a high-speed page (step S825), followed by the process returning to the FIG. 11 process. On the other hand, if the bit value of the speed designation 312 is equal to 0, it is judged that a high-speed page is not designated in advance or nothing is designated, and the process proceeds to a step S823.

In the step S823, the controller 103 determines whether or not the value of the access count 316 of the page allocation information entry 310 is larger than a predetermined value. If the value of the access count 316 is larger than the predetermined value (YES to the step S823), the process proceeds to a step S824. On the other hand, if the value of the access count 316 is smaller than the predetermined value (NO to the step S823), the controller 103 designates the logical page for data writing as a low-speed page (step S826), followed by the process returning to the FIG. 11 process.

In the step S824, the controller 103 determines whether or not the value of the average access interval 317 of the page allocation information entry 310 is smaller than a predetermined value. If the value of the average access interval 317 is smaller than the predetermined value (YES to the step S824), the process proceeds to the step S825. On the other hand, if the value of the average access interval 317 is larger than the predetermined value (NO to the step S824), the process proceeds to the step S826.

By executing the present process, a physical page in a high-speed region is allocated according to conditions shown in FIG. 13. More specifically, even if the speed is not designated as high speed, when the access count is large and when the average access interval is small, a data write destination is designated as a high-speed page (BLC flash memory). This makes it possible to allocate the high-speed region to frequently accessed pages, according to the access frequency.

Next, the physical page allocation processes executed in the respective steps S804 and S811 in FIG. 11 will be described with reference to FIG. 14.

Figure 14:
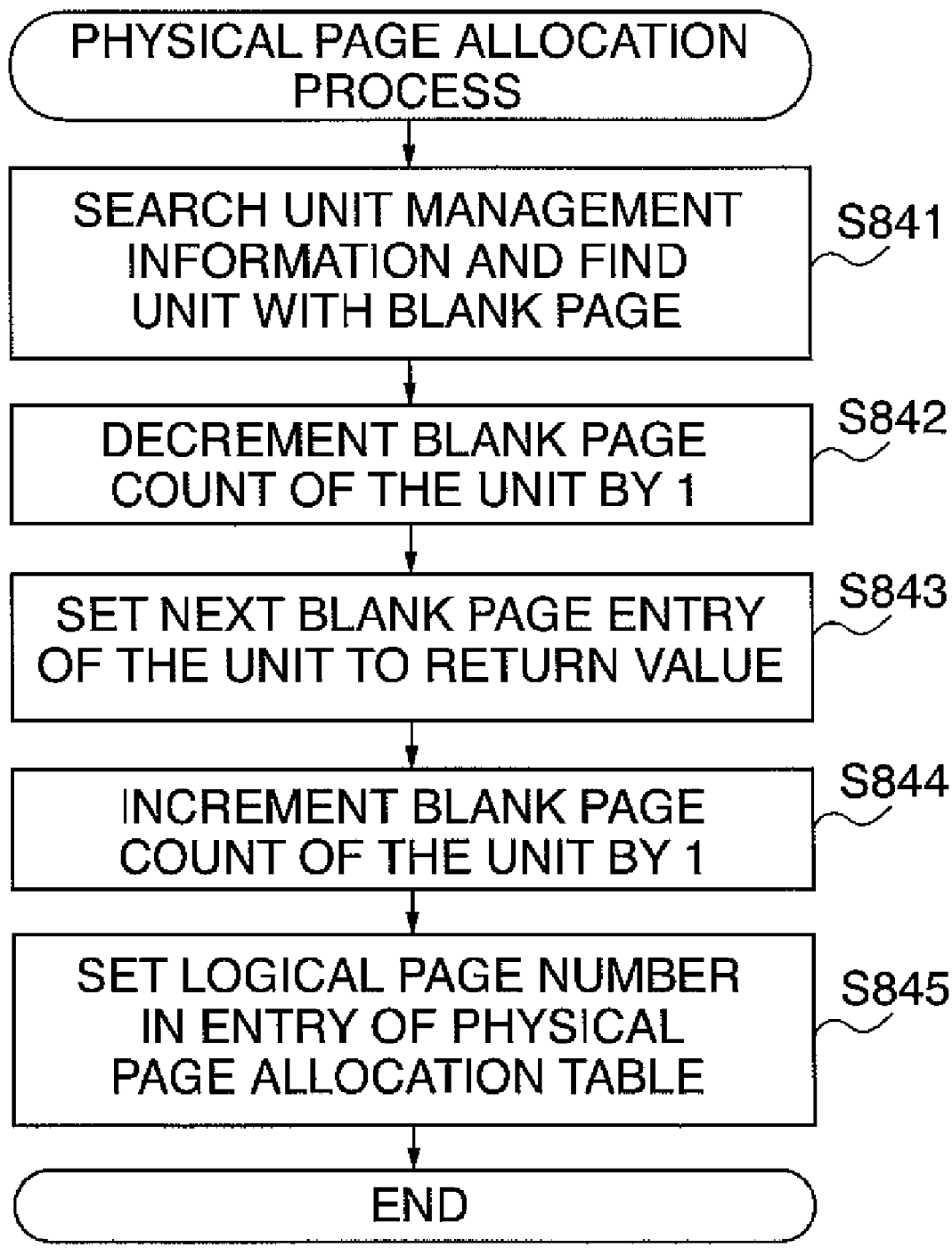
FIG. 14 is a flowchart of a physical page allocation process.

FIG. 14 is a flowchart of the physical page allocation process.

First, the controller 103 searches the unit management information 240 in the unit management table 200 to find a unit containing blank pages (step S841). If a physical page desired to be allocated is designated as a high-speed page, the unit #0 to #X−1 management information 240 are selected as search targets. If a physical page desired to be allocated is designated as a low-speed page (MLC flash memory), the unit #X to #X+Y management information 240 are selected as search targets. When a unit containing blank pages is found, the value of the blank page count 242 of the unit management information 240 of the unit is decremented by 1 (step S842).

Next, the controller 103 sets the value of the next blank page entry 244 of the unit management information 240 of the unit to a return value (step S843) and increments the value of the next blank page entry 244 by 1 (step S844). Then, the controller 103 sets a corresponding entry of an allocated physical page in the physical page allocation table 245 of the unit to the number of the logical page (step S845), followed by the present process returning to the FIG. 11 process. By executing the present process, the controller 103 returns the allocated page entry as a return value.

Next, the garbage collection process executed in the step S708 in FIG. 10 will be described with reference to FIG. 15.

Figure 15:
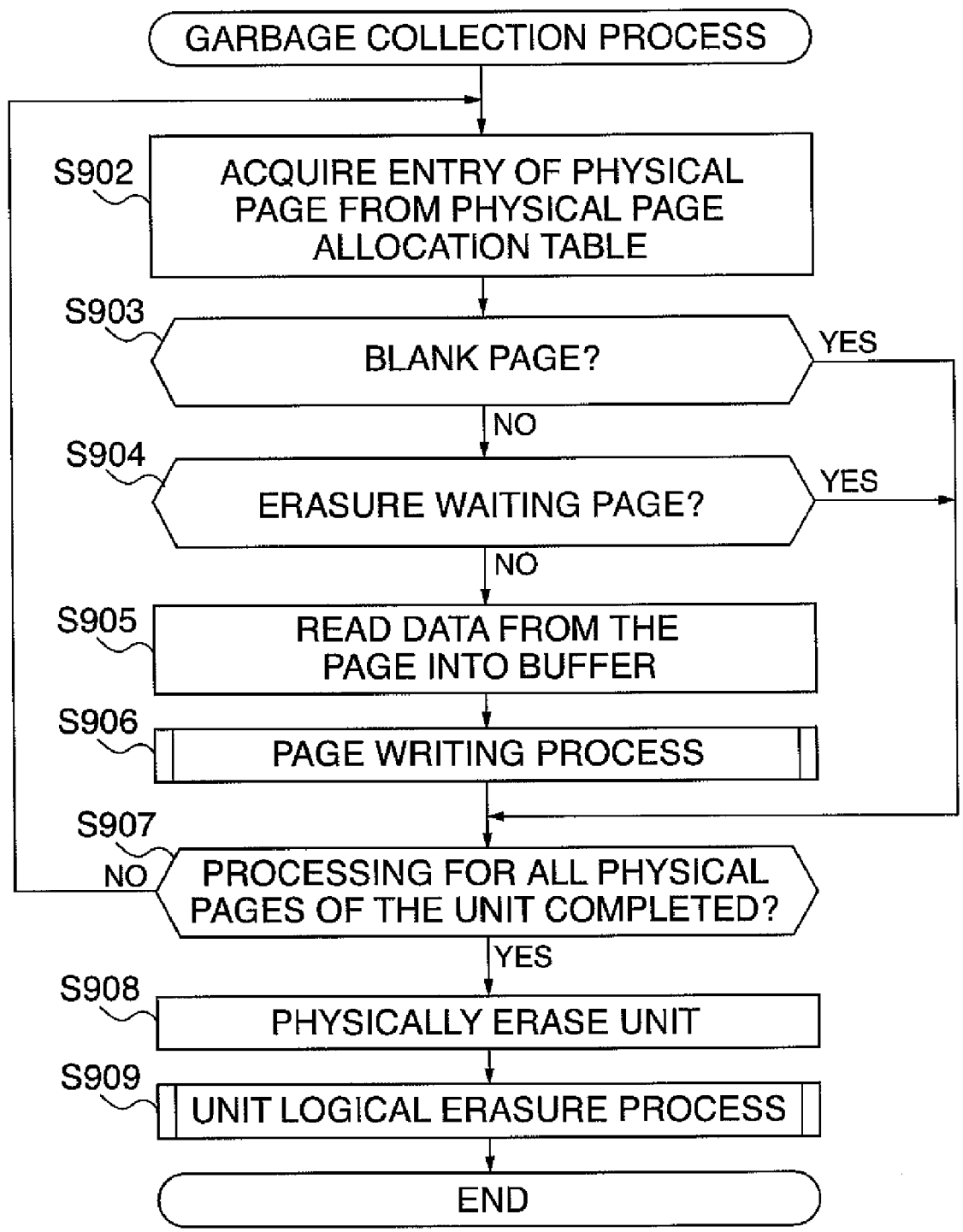
FIG. 15 is a flowchart of a garbage collection process which is executed in a step S708 in FIG. 10.

FIG. 15 is a flowchart of the garbage collection process executed in the step S708 in FIG. 10. Steps S902 to S907 are executed for all the physical pages of the unit.

First, the controller 103 sequentially acquires an entry of a physical page from the physical page allocation table 245 on a loop-by-loop basis (step S902). If the acquired entry is 0xFFFFFFFF, it is judged that the page is blank (YES to the step S903), the steps S904 to S906 are skipped, and the loop is continued. On the other hand, if the acquired entry is 0xFFFFFFF0, it is judged that the page is an erasure waiting page (YES to the step S904), the steps S905 and S906 are skipped, and the loop is continued.

In the step S905, the controller 103 reads out page data from the physical page to a read page buffer in the RAM 106. Then, the page writing process is executed so as to transfer the read-out page data to another physical page (step S906). This page writing process is identical to the process shown in FIG. 11.

In the case of transferring read-out page data to another physical page, the access speed of a logical page is set to the same speed set before the page data transfer, or is designated according to the frequency of access to the page, thereby allocating the physical page to the logical page. Then, the write data associated with the logical page is written in the physical page to which the page data (write data) is to be transferred, and the logical page allocation table 300 is updated.

When execution of the steps S902 to S907 for all the entries of the physical page allocation table 245 is completed, the process exits from the loop to proceed to a step S908 (YES to the step S907).

In the step S908, since no effective data is left in the unit after the processing is completely executed for all the physical pages therein, the controller 103 performs unit physical erasure. In the unit physical erasure, the erasable block of the BLC flash memory 104 or the MLC flash memory 105, which corresponds to the unit, is physically erased. Then, the controller 103 executes a unit logical erasure process (step S909). The unit logical erasure process will be described in detail hereinbelow.

Next, the unit logical erasure process executed in the step S909 in FIG. 15 will be described in detail with reference to FIG. 16.

Figure 16:
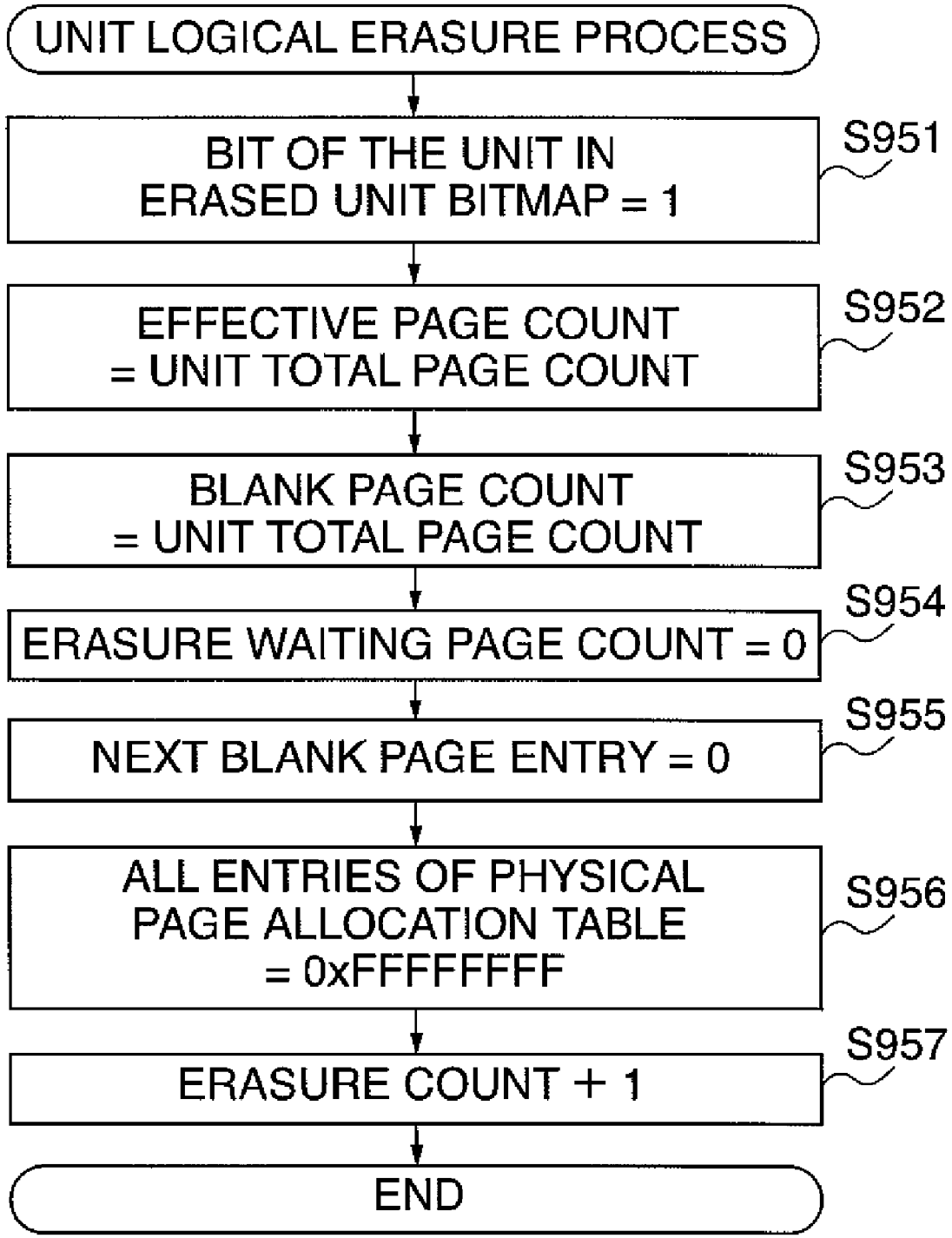
FIG. 16 is a flowchart of a unit logical erasure process which is executed in a step S909 in FIG. 15.

FIG. 16 is a flowchart of the unit logical erasure process executed in the step S909 in FIG. 15.

First, the controller 103 sets the bit value of the unit in the erased unit bitmap 222 of the unit management table 200 to 1 (step S951). Next, the controller 103 sets the effective page count 241 of the unit management information 240 of the unit to M which is the total page count of the unit (step S952). Then, the controller 103 sets the blank page count 242 of the unit management information 240 of the unit to M which is the total page count of the unit (step S953).

Next, the controller 103 sets the erasure waiting page count 243 of the unit management information 240 of the unit to 0 (step S954), the next blank page entry 244 of the unit management information 240 of the unit to 0 (step S955), and all the entries of the physical page allocation table 245 of the unit management information 240 of the unit to 0xFFFFFFFF (step S956). Further, the controller 103 increments the value of the unit erasure count 246 of the unit management information 240 of the unit by 1 (step S957). As a consequence, the unit management information 240 of the unit is brought into an erased state.

Next, a description will be given of a flow of a process for designating an access speed for logical pages (page access speed designation process), from the host system 101 to the storage device 100.

The host system 101 transmits the "Page rate" command appearing in FIG. 5 to the storage device 100. The "Page rate" command is transmitted along with the parameters "start logical page number", "page count", and "access speed". In the storage device 100, the controller 103 receives the "Page rate" command and the parameters "start logical page number", "page count", and "access speed" via the host interface 102 and starts the page access speed designation process for logical pages.

Figure 17:
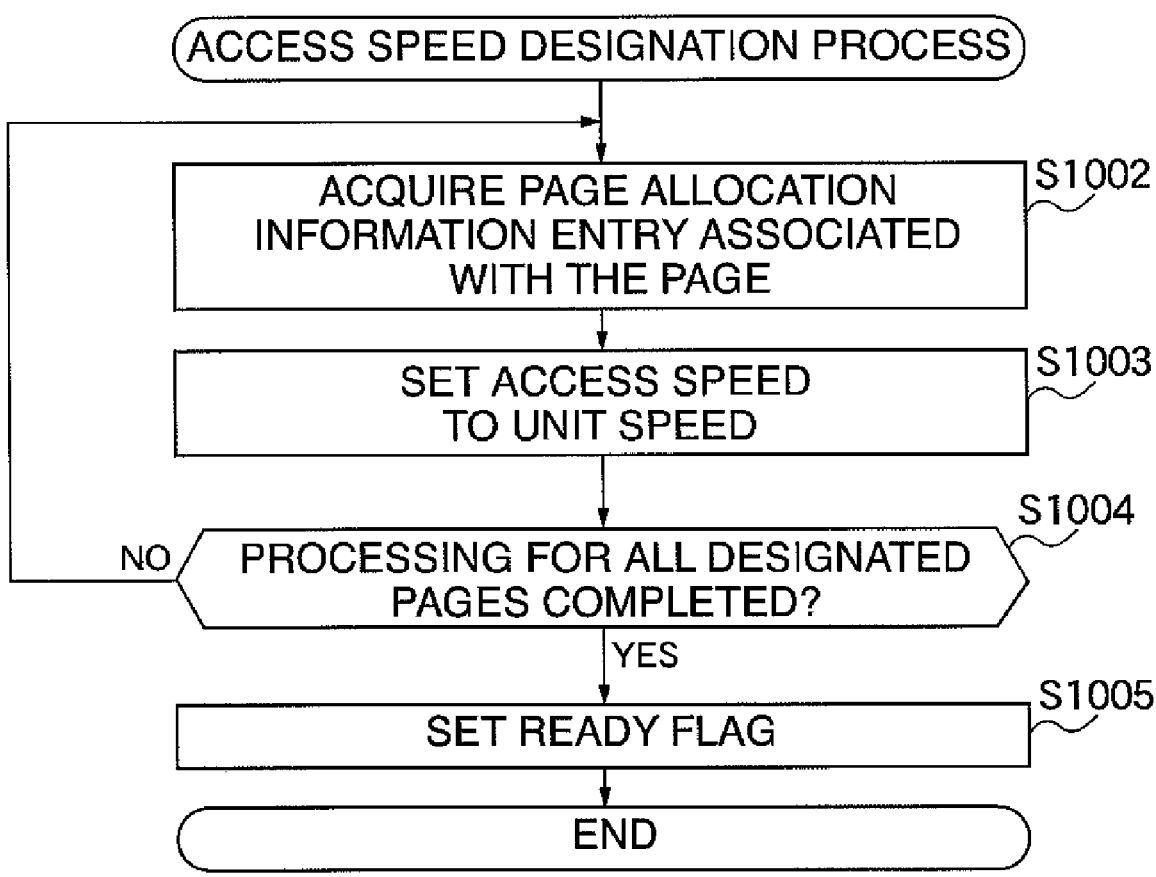
FIG. 17 is a flowchart of a page access speed designation process which is executed by the controller.

FIG. 17 is a flowchart of the page access speed designation process executed by the controller 103.

The controller 103 designates logical pages for which the access speed is to be designated, based on the parameters "start logical page number" and "page count". Steps S1002 and S1004 are executed for all the designated logical pages.

First, the controller 103 acquires a page allocation information entry 310 associated with a designated logical page from the logical page allocation table 300 (step S1002). Then, the controller 103 sets the bit value of the unit speed 313 of the page allocation information entry 310 associated with the logical page to the value of the parameter "access speed" (step S1003).

When designation of the access speed is completed for all the designated logical pages by repeatedly executing the steps S1002 to S1004, the process exits from the loop to proceed to a step S1005 (YES to the step S1004). Then, the controller 103 sets the ready flag for the host interface 102 (step S1005). When the ready flag is set, communication between the host system 101 and the host interface 102 is started to thereby notify the host system 101 that the page access speed designation process has been completed.

In a case where an access speed is designated in advance, physical pages having the designated access speed are allocated to during data writing according to the results of execution of the present process. Further, when an overwrite process or a garbage collection process occurs according to an access status, and the location of physical pages allocated logical pages is changed, physical pages are allocated depending on the access speed determination.

Next, a description will be given of a process executed in a case where a file system operating on the host system 101 logically formats the storage device 100.

Figure 18:
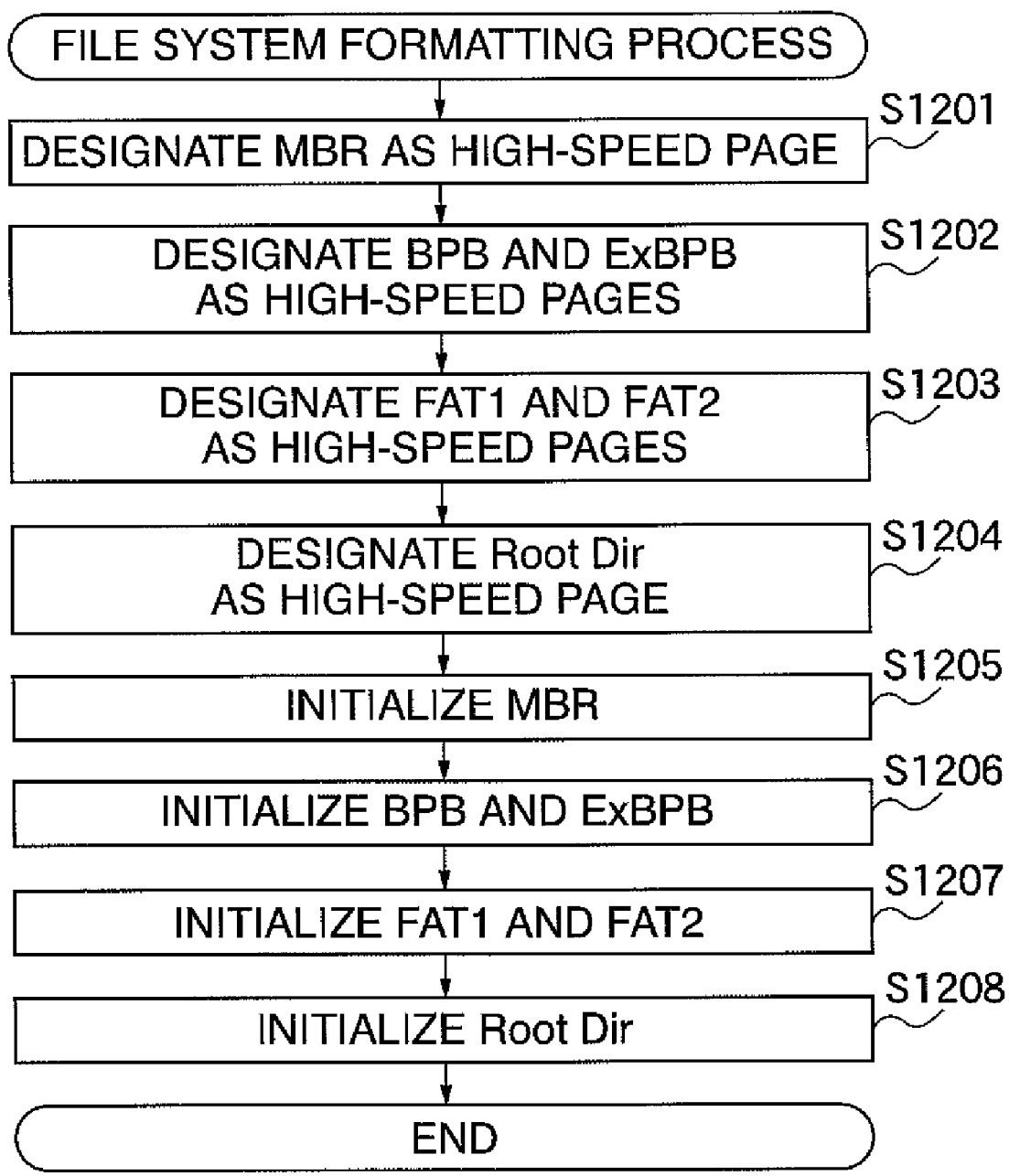
FIG. 18 is a flowchart of a file system formatting process for formatting a file system operating on a host system.
Figure 19:
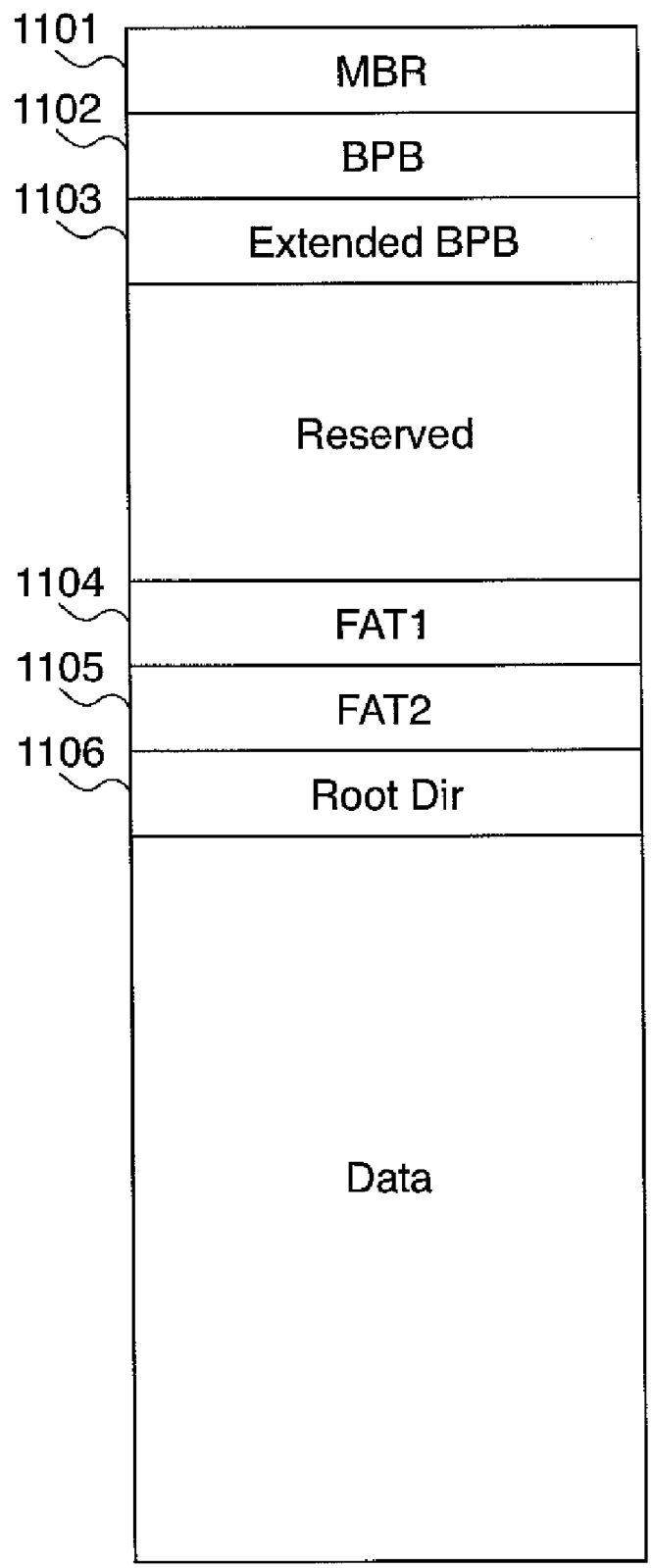
FIG. 19 is a diagram of the data structure of a block device formatted by a FAT file system.

FIG. 18 is a flowchart of a formatting process executed for the file system operating on the host system 101. FIG. 19 is a diagram of the data structure of the inside of a block device formatted by a FAT file system.

The host system 101 designates logical pages for respective sectors in which an MRB (Master Boot Record) 1101 to a root directory entry 1106 are to be disposed, as high-speed pages, using the "Page rate" command (steps S1201 to S1204).

Next, the host system 101 rewrites the values of the MBR 1101 to the root directory entry 1106 using the "Page write" command to thereby bring the MBR 1101 to the root directory entry 1106 into the initial state of the FAT file system (steps S1205 to S1208), followed by terminating the file system formatting process. By execution of the "Page write" command, the logical pages designated in the steps S1201 to S1204 are all disposed as high-speed pages in respective physical pages in the BLC flash memory 104. That is, when the formatting process is executed, storages areas, such as the MBR 1101 to the root directory entry (Root Dir) 1106 in a management area used in the file system, which have a high possibility of frequent access, are disposed in high-speed pages.

In the case of generating a file or a directory in the FAT file system, it is required to generate and dispose a directory entry in the root directory entry 1106 or a sub-directory area, not shown. Therefore, in the case of generating a sub-directory in addition to the root directory entry 1106 and dispose a file in the sub-directory, it is possible to designate logical pages as high-speed pages in advance, using the "Page rate" command. The logical pages correspond to positions of clusters used as a sub-directory area. Thus, a sub-directory area generated as required can also be disposed in high-speed pages.

Disposition of a root directory entry and a sub-directory entry in a high-speed area makes it possible to speed up path-related processing of the directory entries in the FAT file system. Further, file name retrieval and the duplication check of a newly generated file name are sped up, which makes it possible to relatively increase file access speed.

According to the above described first embodiment, in the case of accessing a storage device having memory units (or storage areas) different in access speed, it is possible to allocate arbitrary data to memory units having a high access speed without being restricted in the storage area into which the data is to be written. Further, it is possible to record the frequency of access to each storage area and assign a storage area frequently accessed to a high-speed storage area, so that speed of access to data and files frequently accessed can be effectively increased.

Furthermore, even when the allocation between logical pages (logical block) and physical pages (physical block) is changed e.g. by data overwrite or garbage collection, it is possible to store files or data in a storage area having a desired access speed.

Next, a description will be given of a second embodiment of the present invention.

A memory management device according to the second embodiment is identical in configuration (FIGS. 1 to 5) to the memory management device according to the first embodiment. Therefore, a description will be given of only different points from the first embodiment while designating identical elements by the same reference numerals, and omitting detailed description thereof.

As shown in FIG. 10, in the above described first embodiment, the garbage collection process is executed in timing synchronous with execution of the data writing process by the storage device 100. In the present second embodiment, the garbage collection process is executed not during data writing, but executed as a background process asynchronously with the data writing process. This makes it possible to reduce processing for data writing, thereby relatively shortening processing time for data writing.

Now, a description will be given of a flow of processing in a case where data is written in the storage device 100 by the host system 101.

The host system 101 transmits the "Page write" command appearing in FIG. 5 to the storage device 100. The "Page write" command is transmitted along with the parameters "start logical page number" and "page count" and write data to be written in the associated pages.

In the storage device 100, the controller 103 receives the "Page write" command and the parameters "start logical page number" and "page count" via the host I/F 102 and starts the data writing process. Upon reception of the write data to be written in the pages after receiving the command and the parameters, the host I/F 102 stores the write data in the page buffer area provided in the RAM 106 for data writing in the logical pages.

Figure 20:
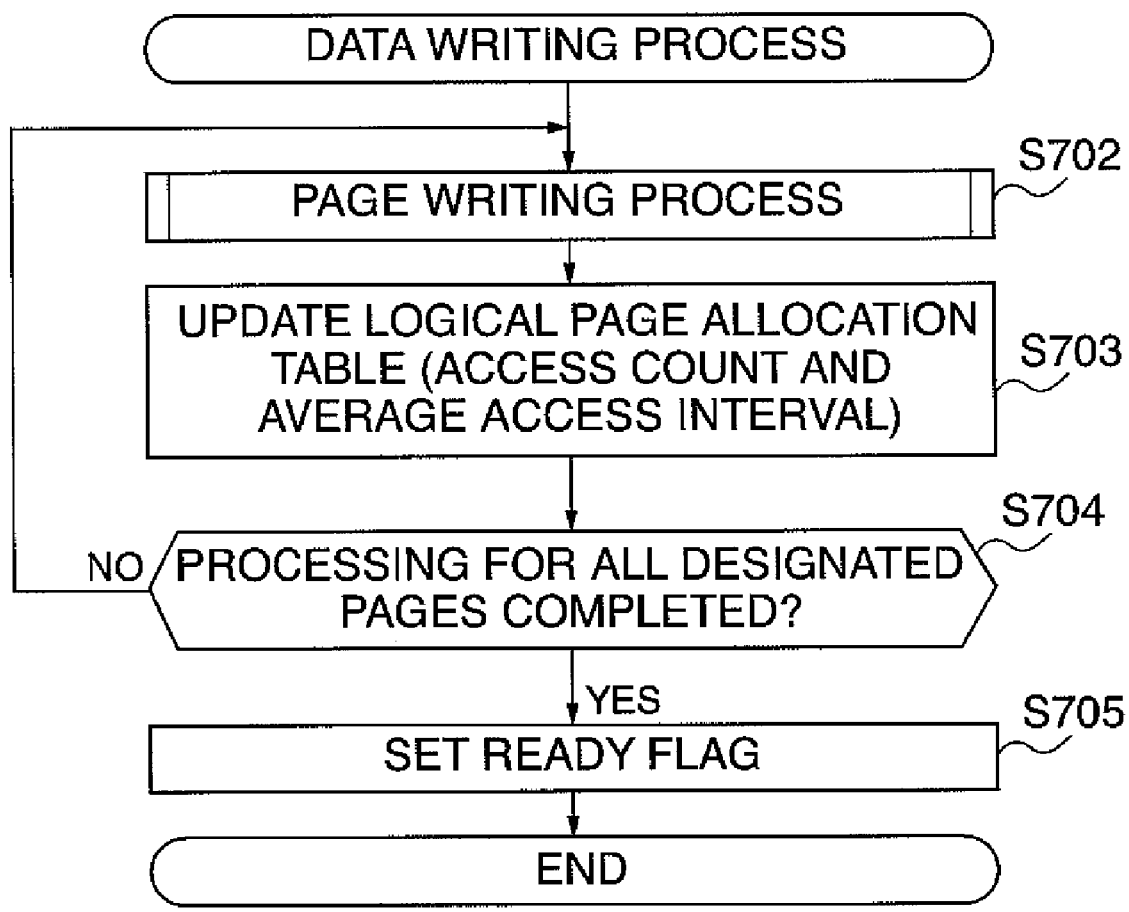
FIG. 20 is a flowchart of a data writing process which is executed by a controller of a storage device of a memory management device according to a second embodiment of the present invention.

FIG. 20 is a flowchart of the data writing process which is executed by the controller 103 of the storage device 100 of the memory management device according to the second embodiment. It should be noted that steps S702 to S705 in FIG. 20 are identical to the steps S702 to S705 in FIG. 10, and therefore description thereof is omitted.

Next, a description will be given of the garbage collection (GC) process executed in the background.

Figure 21:
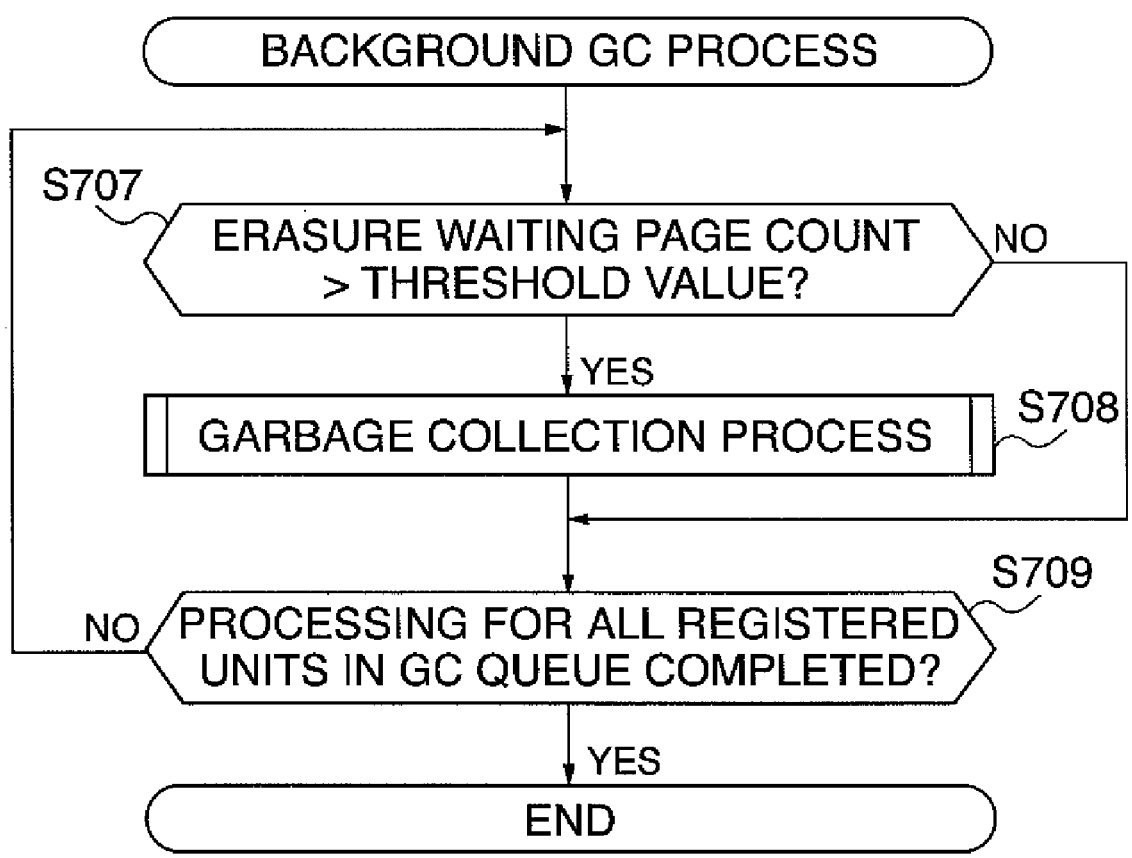
FIG. 21 is a flowchart of a garbage collection process which is executed in a background by the controller.

FIG. 21 is a flowchart of the garbage collection process which is executed in the background by the controller 103. Steps S707 to S709 in FIG. 21 are identical to the steps S707 to S709 in FIG. 10, and therefore description thereof is omitted.

The garbage collection process shown in FIG. 21 is periodically executed at predetermined time intervals. It should be noted that the garbage collection process may be executed whenever the storage device 100 is accessed a predetermined number of times, instead of being executed periodically.

Next, a description will be given of a third embodiment of the present invention.

A memory management device according to the third embodiment is identical in configuration (FIGS. 1 to 5) to the memory management device according to the first embodiment. Therefore, a description will be given of only different points from the first embodiment while designating identical elements by the same reference numerals, and omitting detailed description thereof.

In the above described first embodiment, as shown in FIG. 17, when the host system 101 designates a page speed using the "Page rate" command, only processing for changing the bit value of the speed designation 312 of the page allocation information entry 310 of the associated page is performed.

In the third embodiment, when the host system 101 designates a page speed using the "Page rate" command, the bit value of the speed designation 312 of the page allocation information entry 310 of the associated page is changed, and at the same time, if effective data has already been written in the page, processing for moving the data into a designated high-speed page is executed. As a consequence, even when the "Page rate" command is issued designating pages having effective data written therein, it is possible to change the page allocation, as required, such that the data is moved to designated high-speed pages.

Now, a description will be given of a flow of a process executed in a case where the host system 101 designates the speed of logical pages in the storage device 100.

The host system 101 transmits the "Page rate" command appearing in FIG. 5 to the storage device 100. The "Page rate" command is transmitted along with the parameters "start logical page number", "page count", and "access speed". In the storage device 100, the controller 103 receives the "Page rate" command and the parameters "start logical page number", "page count", and "access speed" via the host I/F 102 and starts a page access speed designation process for logical pages.

Figure 22:
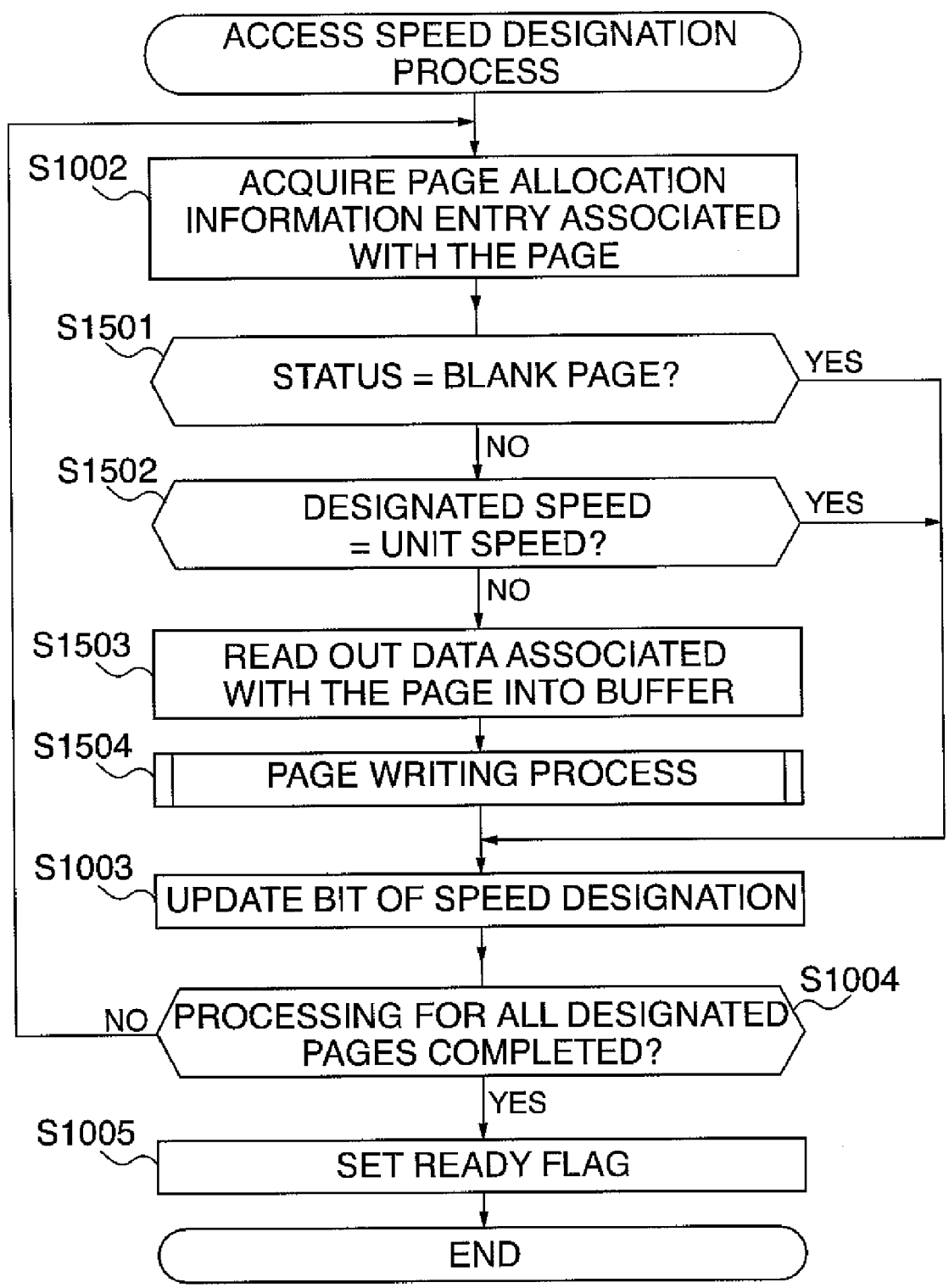
FIG. 22 is a flowchart of a page access speed designation process which is executed by a controller of a storage device of a memory management device according to a third embodiment of the present invention.

FIG. 22 is a flowchart of the page access speed designation process which is executed by the controller 103 of the storage device 100 of a memory management device according to the third embodiment.

The controller 103 designates logical pages for access speed designation, based on the parameters "start logical page number" and "page count" received with the "Page rate" command. Steps S1002, S1501 to S1504, S1003, and S1004 are executed for all the designated logical pages. It should be noted that the steps except the steps S1501 to S1504 are identical to those in FIG. 17, and therefore description thereof is omitted.

In the step S1501, if the bit value of the status 311 of the page allocation information entry 310 associated with the page is equal to 0, the controller 103 judges that the page is blank, and the process proceeds to the step S1003. If the bit value of the status 311 is not equal to 0, the process proceeds to the step S1502. In the step S1502, it is determined whether or not the unit speed 313 of the page allocation information entry 310 associated with the page is equal to the speed designated by the "Page rate" command. If the unit speed 313 is equal to the speed designated by the "Page rate" command, the process proceeds to the step S1003, whereas if not, the process proceeds to the step S1503.

In the step S1503, page data already written in the page is read out into a page buffer in the RAM 106. Then, a page writing process is executed so as to move the read-out page data to another physical page (step S1504). This page writing process is identical to the process shown in FIG. 11.

In the above-described first embodiment, in the step S606 in FIG. 9 and the step S703 in FIG. 10, the values of the access count 316 and the average access interval 317 of the page allocation information entry 310 in the logical page allocation table 300 are updated. However, the memory management device may be configured such that the values of the access count 316 and the average access interval 317 are updated only in the data writing process or only in the data reading process, depending on the use of the storage device 100.

If the values of the access count 316 and the average access interval 317 are updated only in the data writing process, it is possible to provide an advantageous effect that pages in which data is frequently written are disposed in the high-speed area. On the other hand, if the values of the access count 316 and the average access interval 317 are updated only in the data reading process, it is possible to provide an advantageous effect that pages from which data is frequently read are disposed in the high-speed area.

Although in each of the above described embodiments, the storage device is formed using the MLC flash memory and the BLC flash memory, this is not limitative. For example, an HDD may be used to form a second memory area.

It is to be understood that the present invention may also be realized by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-077553 filed Mar. 23, 2007, which is hereby incorporated by reference herein in its entirety.

What is claimed is:

1. A storage device comprising;
a first memory unit;
a second memory unit having a greater access speed than the first memory unit;
a receiving unit configured to receive from a writing device a writing instruction including a logical address in which data is to be written, data to be written in the logical address, and a speed designation instruction, which is different from the writing instruction, for designating an access speed of the logical address;
a control unit configured to:
determine which of a physical address of any one of the first memory unit or the second memory unit is allocated to the logical address based on the speed designation instruction received by the receiving unit;
generate a management information indicating the physical address allocated to the logical address;
write the data in any one of the first memory unit or the second memory unit according to the writing instruction received by the receiving unit;
detect the physical address allocated to the logical address included in the writing instruction received by the receiving unit in accordance with the management information; and
write the data in the detected physical address in any one of the first memory unit or the second memory unit.

2. The storage device according to claim 1, wherein:
the control unit allocates, if a high-speed access is designated by the speed designation instruction, the physical address of the second memory unit to the logical address, and
the control unit allocates, if a high-speed access is not designated by the speed designation instruction, the physical address of the first memory unit to the logical address.

3. The storage device according to claim 1, wherein:
the receiving unit receives the speed designation instruction of a plurality of logical addresses from the writing device in accordance with an initialization of the storage device, and
the control unit allocates a different physical address of any one of the first memory unit or the second memory unit to each one of the plurality of logical addresses based on the speed designation instruction received from the receiving unit.

4. The storage device according to claim 1, wherein:
the control unit allocates a different physical address of any one of the first memory unit or the second memory unit to each one of a plurality of logical addresses based on the speed designation instruction received from the receiving unit, and
the control unit adds to the management information indicating the access speed of the plurality of logical addresses.

5. The storage device according to claim 1, wherein:
each of the first memory unit and the second memory unit comprises a plurality of data blocks each comprising a plurality of bytes, and
the plurality of physical addresses indicate respective addresses of the data blocks.

6. The storage device according to claim 1, wherein:
the control unit further generates a physical address managing information for determining whether or not each of a plurality of physical addresses is an erasure waiting address,
in the case where a first physical address among the plurality of physical addresses has been already allocated to the logical address along with which the writing instruction is received by the receiving unit, the control unit allocates to the logical address a second physical address among the plurality of physical addresses instead of the first physical address while changing the physical address managing information to set the first physical address to the erasure waiting address, and
the control unit writes the data in the second physical address.

7. The storage device according to claim 6, wherein the control unit is further configured to execute, in the case where a number of the erasure waiting addresses is larger than a threshold value, a garbage collection process of bringing into an erased state a data block corresponding to each of the erasure waiting addresses among the data blocks.

8. The storage device according to claim 6, wherein the control unit determines based on the speed designation instruction whether or not any one of the first memory unit or the second memory unit has one of the plurality of physical addresses allocated as the second physical address.

9. The storage device according to claim 1, wherein the first memory unit is a multi-value flash memory, and the second memory unit is a binary flash memory.

10. The storage device according to claim 1, wherein:
the receiving unit further receives a reading data instruction along with logical address from which data is to be read from the writing device, and
the control unit further detects physical address of any one of the first memory unit or the second memory unit allocated to the logical address along with which the reading data instruction is received by the receiving unit and reads the data from the detected physical address.

11. The storage device according to claim 10, wherein if a number of reading data instructions to read the data from a first logical address to which the physical address of the first memory unit is allocated reaches a threshold value, the control unit changes the physical address allocated to the first logical address from the physical address of the first memory unit to the physical address of the second memory unit.

12. A system comprising:
a writing device configured to designate a logical address in which data is to be written, and output a writing instruction including the logical address, the data to be written in the logical address, and speed designation instruction, which is different from the writing instruction, relating to an access speed of the logical address; and
a storage device comprising:
a first memory unit;
a second memory unit having a greater access speed than the first memory unit;
a receiving unit configured to receive from the writing device the writing instruction, the data, and the speed designation instruction;
a control unit configured to:
determine which of a physical address of any one of the first memory unit or the second memory unit is allocated to the logical address based on the speed designation instruction received by the receiving unit;
generate a management information indicating the physical address allocated to the logical address;
write the data in any one of the first memory unit or the second memory unit according to the writing instruction received by the receiving unit;

detect the physical address allocated to the logical address included in the writing instruction received by the receiving unit in accordance with the management information; and write the data in the detected physical address in any one of the first memory unit or the second memory unit.

13. A system comprising:

a storage device; and a host device that accesses the storage device in accordance with a File Allocation Table (FAT) file system, wherein the host device designates logical addresses to which data are stored and outputs a first command instructing a writing of the data in the designated logical addresses and a second command, which is different from the first command, for designating an access speed of logical address to the storage device, wherein the storage device has a first memory unit and a second memory unit having a greater access speed than the first memory unit, wherein the storage device allocates the logical addresses to a physical address of any one of the first memory unit or the second memory unit based on the second command output from the host device and generates management information indicating the physical address allocated to the logical address, wherein the storage device writes the data to the physical address allocated to the second logical address designated by the first command based on the management information, wherein the host device outputs, in accordance with an initialization of the storage device, the second command for designating an access speed of each of first logical addresses where a FAT and a directory entry used for the FAT file system are to be stored at high speed, and wherein the storage device allocates each of the first logical addresses to the physical address of the second memory unit in accordance with the second command for designating the access speed of each of first logical addresses at high speed.

14. The system according to claim 13, wherein the host device further outputs to the storage device the first command to write a subdirectory entry used for the FAT file system and the second command including a second logical address to which the subdirectory entry is stored and indicating that the access speed of the second logical address is high speed in accordance with generation of the subdirectory.

15. A method of controlling a storage device having a first memory unit and a second memory unit having a greater access speed than the first memory unit, the method comprising:

a receiving step of receiving from a writing device a writing instruction including a logical address in which data is to be written, data to be written in the logical address, and a speed designation instruction, which is different from the writing instruction, for designating an access speed of the logical address;

a determining step of determining which of a physical address of any one of the first memory unit or the second memory unit is allocated to the logical address based on the speed designation instruction;

a generating step of generating a management information indicating the physical address allocated to the logical address;

a first writing step of writing the data in any one of the first memory unit or the second memory unit according to the writing instruction received in the receiving step; and a detecting step of detecting the physical address allocated to the logical address included in the writing instruction received in the receiving step in accordance with the management information; and a second step of writing the data in the detected physical address in any one of the first memory unit or the second memory unit.

16. A writing apparatus that designates:

a logical address in which data is to be written, and outputs a first command for instructing a writing of data in the designated logical address to a storage device having a first memory unit and a second memory unit, which has a greater access speed than the first memory unit; and wherein the writing device outputs to the storage device a second command, which is different from the first command, for designating an access speed of the logical address, and wherein the writing apparatus outputs to the storage device the second command so that a physical address of the second memory unit is allocated to the logical address, if the second command designates high speed access, and a physical address of the first memory unit is allocated to the logical address if the second command does not designate high speed.

17. The writing apparatus according to claim 16, wherein the writing apparatus outputs to the storage device the second command in accordance with an initialization of the storage device.

18. A host device that accesses:

a storage device, having a first memory unit and a second memory unit, which has a greater access speed than the first memory unit, in accordance with a File Allocation Table (FAT) file system, wherein the host device designates a logical address in which data is to be written and outputs to the storage device a first command for instructing a writing of data in the designated logical address and a second command, which is different from the first command, for designating an access speed of logical address, wherein the host device outputs to the storage device the second command so that a physical address of the second memory unit is allocated to the logical address if the second command designates high speed access, and allocates a physical address of the first memory unit to the logical address if the second command does not designate high speed access, and wherein the host device outputs the second command designating that the access speed of each of first logical addresses where data from a master boot record to a root directory entry used for the FAT file system are to be stored is high speed, so that the first logical addresses are allocated to physical addresses of the second memory unit.

* * * * *